(12) United States Patent
Veerasamy

(10) Patent No.: US 10,921,672 B2
(45) Date of Patent: Feb. 16, 2021

(54) LOW HAZE SWITCHABLE WINDOW

(71) Applicant: Guardian Glass, LLC, Auburn Hills, MI (US)

(72) Inventor: Vijayen S. Veerasamy, Ann Arbor, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 426 days.

(21) Appl. No.: 15/467,189

(22) Filed: Mar. 23, 2017

(65) Prior Publication Data

US 2017/0276978 A1  Sep. 28, 2017

Related U.S. Application Data

(60) Provisional application No. 62/312,118, filed on Mar. 23, 2016.

(51) Int. Cl.
*G02F 1/137* (2006.01)
*G02F 1/1333* (2006.01)
(Continued)

(52) U.S. Cl.
CPC ............ *G02F 1/137* (2013.01); *E06B 3/6608* (2013.01); *E06B 3/6722* (2013.01); *E06B 9/24* (2013.01);
(Continued)

(58) Field of Classification Search
CPC .................. G02F 1/137; G02F 1/13439; G02F 1/133305; G02F 1/133377; G02F 1/1334;
(Continued)

(56) References Cited

U.S. PATENT DOCUMENTS 5,745,198 A   4/1998  Havens et al.
6,049,366 A   4/2000  Hakemi et al.
(Continued)

FOREIGN PATENT DOCUMENTS

CN   101794043 A   8/2010
JP   H10-062757 A   3/1998
(Continued)

OTHER PUBLICATIONS

U.S. Appl. No. 62/312,118, filed Mar. 23, 2016; Veerasamy.
(Continued)

*Primary Examiner* — Charles S Chang

(57) ABSTRACT

A switchable window includes an electro-optical layer of or including an anisotropic gel of polymer stabilized highly chiral liquid crystal, for example, blue phase liquid crystal, encapsulated in, for example, a mesogenic polymer inclusive shell, that forms a self-assembled, three-dimensional photonic crystal that remains electro-optically switchable under a moderate applied voltage (e.g., electric field). The liquid crystal (LC) arrangement may be achieved via a polymer assembled blue phase liquid crystal system having a substantially continuous polymer structure case surrounding well-defined discrete bodies of liquid crystal material arranged in a cellular manner. These assembled structures globally connect to form a matrix. This provides for reduction of angular birefringence of highly chiral LC systems, which advantageously reduces haze in applications such as switchable windows.

64 Claims, 11 Drawing Sheets

(51) Int. Cl.
*E06B 3/66* (2006.01)
*G02F 1/1334* (2006.01)
*E06B 3/67* (2006.01)
*E06B 9/24* (2006.01)
*G02F 1/1343* (2006.01)
*G02F 1/133* (2006.01)

(52) U.S. Cl.
CPC ........ *G02F 1/1334* (2013.01); *G02F 1/13439* (2013.01); *G02F 1/13718* (2013.01); *G02F 1/133305* (2013.01); *G02F 1/133377* (2013.01); *E06B 2009/2464* (2013.01); *G02F 1/13306* (2013.01); *G02F 2001/13345* (2013.01); *G02F 2001/13756* (2013.01); *G02F 2001/13775* (2013.01); *G02F 2001/13793* (2013.01); *G02F 2202/06* (2013.01); *G02F 2202/09* (2013.01); *G02F 2202/32* (2013.01)

(58) Field of Classification Search
CPC . G02F 2001/13756; G02F 2001/13775; G02F 2001/13793; G02F 2202/06; G02F 2202/09; E06B 3/6608; E06B 3/6722; E06B 9/24; E06B 2009/2464
USPC ....................................................... 349/86–94
See application file for complete search history.

(56) References Cited

U.S. PATENT DOCUMENTS

| | | |
|---|---|---|
| 6,203,723 B1 | 3/2001 | Hsu |
| 6,204,900 B1* | 3/2001 | Fergason ............ G02F 1/1334 349/86 |
| 8,199,264 B2 | 6/2012 | Veerasamy |
| 8,941,788 B2 | 1/2015 | Brecht et al. |
| 9,333,728 B2 | 5/2016 | Veerasamy |
| 2007/0008262 A1 | 1/2007 | Harada et al. |
| 2010/0165260 A1 | 7/2010 | Hiji et al. |
| 2011/0261306 A1 | 10/2011 | Tsai et al. |
| 2012/0135450 A1 | 5/2012 | Abbott et al. |
| 2013/0229612 A1 | 9/2013 | Gayout et al. |
| 2014/0368783 A1* | 12/2014 | Choi .................... G02F 1/1309 349/199 |
| 2015/0175564 A1 | 6/2015 | Sakamoto et al. |
| 2016/0085095 A1 | 3/2016 | Chien et al. |

FOREIGN PATENT DOCUMENTS

| | | |
|---|---|---|
| JP | H11-080734 A | 3/1999 |
| JP | 2000-019494 A | 1/2000 |
| JP | 2005-202016 A | 7/2005 |
| JP | 2006-099039 A | 4/2006 |
| JP | 2007-057671 A | 3/2007 |
| JP | 2008-065129 A | 3/2008 |
| JP | 2010-002664 A | 1/2010 |
| JP | 2012-137756 A | 7/2012 |
| JP | 2013-080198 A | 5/2013 |
| WO | WO 2013/110564 | 8/2013 |
| WO | WO 2014/210165 | 12/2014 |

OTHER PUBLICATIONS

Notice of Reasons for Refusal received for Japanese patent application No. 2018-549505, dated Sep. 10, 2019, 13 pages. (6 pages of English translation and 7 pages of official copy).

* cited by examiner

LOW HAZE SWITCHABLE WINDOW

This application is based on and claims priority to U.S. Provisional Patent Application Ser. No. 62/312,118 filed in the U.S. Patent and Trademark Office on Mar. 23, 2016, the content of which is incorporated by reference herein in its entirety.

BACKGROUND

Field

A switchable window includes an electro-optical layer of or including an anisotropic gel of polymer stabilized highly chiral liquid crystal, for example, blue phase liquid crystal, encapsulated in, for example, a mesogenic polymer inclusive, that forms a self-assembled, three-dimensional photonic crystal that remains electro-optically switchable under a moderate applied voltage (e.g., electric field). The liquid crystal (LC) arrangement may be achieved via a polymer assembled blue phase liquid crystal system having a substantially continuous polymer structure case surrounding well-defined discrete bodies of liquid crystal material arranged in a cellular manner. These assembled structures globally connect to form a matrix. This provides for reduction of angular birefringence of highly chiral LC systems, which advantageously reduces haze in applications such as switchable windows. Such low haze switchable liquid crystal arrangements can be used in various applications including, without limitation, switchable windows for use in commercial building windows, office building interior or exterior windows, and/or residential building windows.

Description of Related Art

An example of a switchable window is an electrically switchable window which changes light transmission properties in response to an electric field. Known uses of this technology include windows and/or glazings in vehicles, commercial buildings (e.g., offices, conference rooms, lobbies, buildings, store fronts, etc.), and/or residential buildings. Switchable windows may also be referred to as privacy shutters.

A transparent window (non-switchable), which is always fully transparent, may not be desirable in certain instances. For example, sunlight through a vehicle window may result in glare to the vehicle's passengers and/or excessive heat in the interior of the vehicle. Thus, a preferred window may allow some light to be transmitted at advantageous times and to allow light to be blocked at other advantageous times. To control light transmission through a window, some windows contain a photochromic or thermochromic material which changes its transmissive properties based on the amount of light incident on the material. These changes in transmissive properties are always automatic and cannot be overridden by human or other intervention and are not dynamically adjustable by application of, for example, an electric field to the material.

On the other hand, liquid crystals (LCs)—for example, polymer dispersed liquid crystals (PDLCs) and plasma addressed liquid crystals (PALCs)—vary the intensity of light transmitted through a liquid crystal medium/layer by changing the orientation of the liquid crystal molecules suspended the medium/layer in response to an electric field. A constant electric field may be applied by a direct current (DC) voltage. Alternatively, the polarity of the electric field may be periodically switched by application of an alternating current (AC) voltage. The applied voltage may be electrically connected to a controller (e.g., electronic control unit, timer, switch, etc.) to be activated automatically with changing environmental or other conditions, or be activated via a switch by a human operator. LCs may even allow intermediate states between an "on" (transmissive or partially transmissive) state and an "off" (opaque or substantially opaque) state by varying the intensity of the electric field of the liquid crystal medium/layer.

Switchable windows or privacy shutters using liquid crystal generally comprise a liquid crystal layer of controlled thickness (typically defined by spacers in the cell gap) sandwiched between two substrates. Each substrate is coated with transparent, electrically conductive coating on the side facing the liquid crystal layer to enable an electric field to be applied to the liquid crystal layer. The substrates may be glass or a polymer substrate film. If the substrates are film, then it is possible to laminate the liquid crystal film to regular window glass panes on one or both sides by use of an interlayer such as PVB and EVA. Such a combined LC film and glass laminate is sometimes referred to as a solid state switchable window.

The process of laminating a liquid crystal film between glass panes using one or more interlayer sheets subjects the film to pressure, elevated temperature and vacuum. Difficulties can arise due to mismatched thermal expansion indices between the different materials. Furthermore, even after lamination, subsequent handling of the finished laminate can subject the liquid crystal layer to shear forces as the two glass panes sandwiching the liquid crystal layer flex, especially if the window is greater than 1 meter in any direction. In order for the film to withstand the lamination process and subsequent handling, the liquid crystal layer may have a polymeric (or other) backbone structure to support the liquid crystal. There are several known polymer-liquid crystal structures. Each suffers from drawbacks. Some are fundamentally unsuitable for lamination, whereas those that can be laminates suffer from optical problems, such as excessive haze or an excessively limited range of transparent viewing angles.

PDLCs are typically made by inducing phase separation in an initially homogeneous mixture of liquid crystal and monomers. Preparation of PDLCs involves a phase separation, which can be triggered by polymerization of the monomer matrix by either ultraviolet (UV) or thermal curing, or even rapid evaporation of solvents. As the monomer polymerizes, the liquid crystal phase separates into microscopic droplets or domains or pockets surrounded by the walls of the cured polymer matrix, which provides a "backbone" to hold the LC. The mixture of cured polymer and LC are held together between two sheets of polyethylene (PET), often coated with transparent conducting oxides (TCOs) through which an electric field is applied. When unaddressed (e.g., when no voltage and/or voltage below a LC threshold voltage is applied), the nematic texture within the domains of the LC is randomly oriented with respect to other neighboring domains, and the display appears whitish and/or opaque caused by the scattering of light.

FIG. 1(a) illustrates a related art PDLC glass window 100 in an off state. Two glass substrates 102a, 102b are provided. A conductive coating 104 is applied to the respective inner surfaces of the outer substrates 102a and 102b. A plurality of liquid crystal (LC) droplets 108 are disposed within the polymer mixture 106. When no voltage is provided, the droplets 108 are randomly oriented, and incident light I refracts off them, causing the scattering of light in the directions illustrated by the dashed arrows.

In the addressed state (when voltage above the threshold voltage is applied to the liquid crystal layer), the nematic texture in different domains align with the electric field, thus allowing for a clear state as illustrated in FIG. 1(b). FIG. 1(b) is a related art PDLC glass window 100 in an "on" state. FIG. 1(b) is similar to FIG. 1(a), except that a voltage V is applied to the PDLC layer via conductor 104 and one or more bus bars (not shown). The voltage causes the liquid crystal droplets of the PDLC layer to align substantially parallel to the electric field, allowing incident light I to pass through the window 100 in providing for a substantially clear state.

Conventional PDLC switchable windows use liquid crystal layers that experience a large change in effective refractive index from about 1.51 to about 1.77 going from 0 to 90 degrees angle of incidence, which results in significant haze in the window such as haze values of over 10% at large viewing angles. Large haze values are undesirable, at both a normal viewing angle and at large viewing angles such as at 45 degrees from normal, as they render the window aesthetically displeasing.

U.S. Patent Document 2009/0115922 to Veerasamy, the entire contents of which are hereby incorporated herein by reference, attempts to overcome some of the disadvantages associated with degradation of the PDLC through the use of a low-emissivity (low-E) coating. However, the window of 2009/0115922 has high haze in both the ON and OFF states.

FIG. 2 is a cross-sectional view of a related art window according to an embodiment of U.S. Patent Document 2009/0115922. In the window of FIG. 2, two substrates (e.g., glass substrates) 202, 204 are provided, including an outer substrate 202 and an inner substrate 204. A low-E coating 206 is deposited on the inner surface of the outer substrate 202. The transparent conductive oxide (TCO) layer 212 for applying voltage across the PDLC layer 214 is located between the PDLC layer 214 and the low-E coating 206.

First and second laminate layers 208 are provided. First and second polymer-based (e.g., PET) layers 210 are provided on the inner surfaces of the respective first and second laminate layers 208. A switchable PDLC layer 214 is sandwiched by first and second substantially transparent conductive oxide (e.g., TCO) layers 212. The TCO layers may be sputtered onto one or both surfaces of the PDLC 214 and/or the respective surfaces of the first and second polymer-based layers 210.

Noticeable haze remains as a consequence of the PDLC structure, independent of any degradation. Another source of degradation in PDLC and PALC arrangements is that their modulation is based on the motion of simple planar or twisted nematic liquid crystals, which are inherently based on a relatively slow electro-motive mechanism due to viscoelastic properties at molecular scales. The properties, under electrical stress, also make these arrangement susceptible to long term degradation due to, for example, weathering effects such as UV and humidity. A pertinent problem in the clear or transmissive state is the level of residual haze that increases at large viewing angles with the window of U.S. Patent Document 2009/0115922.

Other examples include Nematic Curvilinear Aligned Phase (NCAP) and Polymer Stabilized Cholesteric Cell (PSCC), both of which suffer similar disadvantages with respect to transmissive (e.g., ON) state residual haze at increasing viewing angles.

In this connection, what is needed is an improved LC arrangement that addresses the problems and disadvantages associated with known PDLC arrangements, such as, for example, unacceptably high residual haze values in the clear or transmissive state, especially at increasing viewing angles.

SUMMARY

To overcome the above and other disadvantages with respect to known PDLC, PALC, NCAP, PSCC, and the like, arrangements, such as, for example, and without limitation, relatively large haze values, especially at increasing viewing angles, the present disclosure provides a novel LC arrangement comprising an anisotropic gel of polymer stabilized highly chiral liquid crystal, an example of which may be blue phase liquid crystal, encapsulated in, for example, a mesogenic polymer inclusive shell, that forms a self-assembled, three-dimensional photonic crystal that remains electro-optically switchable under a moderate applied voltage (e.g., electric field).

For example, the polymer stabilized highly chiral liquid crystal arrangement may be achieved via a polymer-assembled blue phase liquid crystal system having a substantially continuous polymer structure case surrounding well-defined discrete bodies of liquid crystal material arranged in a cellular manner. These assembled structures globally connect to form a matrix. This provides for reduction of angular birefringence of highly chiral LC systems.

The cells of polymer stabilized highly chiral liquid crystal material exhibit a poly domain operating state in which the liquid crystal material within each body is arranged in multiple domains, each domain being defined by a quantity of liquid crystal material whose molecules have a substantially common identifiable small helicoidal pitch in at least one axis, wherein the resolved alignments of neighboring domains diverge substantially from one another and are stable over time. Upon the application of an electric field, the liquid crystal molecules in each domain take a similar configuration such that the electro-optic properties of the system matches that of the polymer host and the system becomes transparent and has very low residual haze in the transmissive state (e.g., in the range of, for example, less than 4% at virtually all viewing angles, including high off-axis viewing angles). At the same time, such a liquid crystal arrangement maintains good opacity in the non-transmissive state, e.g., a haze value of 100%±3%.

An example of polymer stabilized highly chiral liquid crystal is polymer-assembled blue phase liquid crystal. For ease of description, the disclosure may describe various embodiments with reference to a blue phase liquid crystal. It will be understood by one of ordinary skill in the art that the disclosure is not limited to blue phase liquid crystal, and that the disclosure relates to polymer stabilized highly chiral liquid crystal generally, and that the descriptions herein apply equally to any polymer stabilized highly chiral liquid crystal. Polymer stabilized highly chiral liquid crystal droplets (e.g., blue phase liquid crystal encapsulated in a polymer inclusive shell), can also be arranged in electro-optical films with both perpendicular to pane and in-plane electric field switching. For example, films may be prepared via solvent evaporation-induced phase separation of a mixture of blue phase liquid crystal (BPLC) and polymer. The film may be coated directly on, for example, glass or PET, laminated between two coated conductive substrates (e.g., ITO coated conductive substrates), and enable switching between light-scattering and transparent states in response to electric fields applied across the film.

The polymer stabilized highly chiral liquid crystal (e.g., BPLC) encapsulated in the polymer inclusive shell may be achieved by mixing a stabilized hypertwisted liquid crystal with a monomomer mixture including one or more monomers and a photoinitiator. The polymer inclusive shell is preferably a mixture of polymer and liquid crystal. The hypertwisted liquid crystal may be formulated by mixing a nematic liquid crystal material with one or more chiral dopants (which may be referred to herein as "twisters") that result in a stabilized hypertwisted liquid crystal. When the stabilized hypertwisted liquid crystal and monomer mixture are mixed, the result is bi-stable state of liquid crystal comprising a plurality of discrete spheroidal bodies of hypertwisted chiral nematic liquid crystal microencapsulated by a polymer inclusive shell (micro-cells). The introduction of chiral dopants to the nematic liquid crystal causes twisting of the liquid crystal. The hypertwisted liquid crystal may then form a self-assembled, three-dimensional photonic crystal that remains electro-optically switchable under a moderate applied voltage. This arrangement of liquid crystals may be referred to herein as BPLC. The resulting polymer stabilized highly chiral liquid crystal encapsulated in the polymer inclusive shell may be referred to herein as a core-shell scatterer. In short, a scatterer comprises a core of immiscible nematic liquid crystal and chiral dopant (twisters) encapsulated in a polymer inclusive shell. The core-shell scatterers may be disbursed in a polymer scaffold or connective polymer matrix.

Use of a core-shell scatterer arrangement instead of molecular birefringence addresses and overcomes issues associated with mismatch of indices of refraction due to, for example, peripheral nematogens. Use of a very small pitch polymer stabilized highly chiral liquid crystal (e.g., BPLC) as the scatter core is preferred. The pitch depends on both twisting power and concentration of the chiral dopants used to make the highly chiral liquid crystal (e.g., BPLC). Using mixtures of nematic liquid crystals and chiral dopants provides several advantages, including, for example, and without limitation, inducing immiscibility gap at ambient conditions; increasing opacity in the off (non-transmissive) state due to random birefringence in the off state; and ability to tune birefringence with an applied electric field so that angular on (transmissive) state haze is low (e.g., <4% for a wide range of viewing angles, e.g., of 60° or greater). Haze can be reduced by designing the layer so that effective refractive indices of at least certain components thereof, in the ON state, do not significantly change across a wide range of viewing angles.

Typically, liquid crystals are made from rod-like molecules that line up in at least one direction while remaining mobile and disorderly in other directions. In polymer stabilized highly chiral liquid crystal, such as, for example, and without limitation, BPLC, this alignment of molecules takes a complicated form. In BPLC, the liquid crystal molecules, by virtue of the addition of chiral dopants (twisters) assemble into cylindrically shaped arrays in which the direction of alignment twists in a helix, while the helices themselves criss-cross in three dimensions, and the structure repeats regularly every several hundred nanometers. This results in a self-assembled, three-dimensional photonic crystal that remains electro-optically switchable under a moderate applied voltage (e.g., electric field). The polymer stabilized highly chiral liquid crystal, such as, for example, and without limitation, BPLC, comprises the core of the core-shell scatterer. As noted above, the core-shell scatterers may be disbursed in a polymer scaffold or connective polymer matrix.

The core-shell scatterers disbursed on a polymer scaffold or connective polymer matrix may be arranged in an electro-optical layer sandwiched between two substrates having transparent conductive electrodes (e.g., made of indium-tin-oxide, fluorine-doped tin oxide, silver, or other suitable material) disposed on inward facing surfaces thereof. For switchable applications, such as a switchable window, the micro-cells of polymer stabilized highly chiral liquid crystal are selectively operable in at least two states. In a first state, light is transmitted through a liquid crystal body, and in a second state, light is scattered and absorbed by the liquid crystal body. Each body in the second state has an ordered liquid crystal texture that minimizes and/or reduces disclinations or domains within the liquid crystal body. The liquid crystal texture comprises a superstructure of hyper twisted chiral nematic liquid crystal.

An example way to make polymer-stabilized highly chiral liquid crystal like BPLC may include forming a polymer stabilized highly chiral liquid crystal, e.g., BPLC, by adding chiral dopants to a nematic or core bent liquid crystal host. Preferably, the liquid crystal host has a wide nematic range. Chiral dopants introduce high chirality to the nematic liquid crystal host and induce blue phases. The pitch length (p) is inversely proportional to the helical twisting power (HTP) and concentration (c) of the chiral dopant. For example, $p=1/(HTP \times c)$. Therefore, pitch length, and hence Bragg reflection wavelength, can be tuned by choosing different chiral dopants or varying the concentration of the chiral dopant. Increasing chiral dopant concentration for a dopant having a weaker HTP may lead to some disadvantages, such as, for example, the ratio of nematic LC host molecules is lowered resulting in a lower Kerr constant, decreasing the clearing point of the polymer stabilized highly chiral liquid crystal or BPLC, and saturation in pitch length. According to the present disclosure, adding two different chiral dopants to the liquid crystal host results in desirable liquid crystal properties. A small fraction of monomers and a photoinitiator are added to the liquid crystal and chiral dopant solution, once the liquid crystal and chiral dopant solution has been stabilized. The core-shell scatterers are formed by mixing the liquid crystal and chiral dopant solution with a solution of monomers and photoinitiator, incubating the mixture in, for example, a hot water beaker bath, and cooling in a ramp down manner to room temperature. Once polymerization is initiated, a non-equilibrium structure may occur in a manner dependent on competition between phase separation dynamics and reaction kinetics. As oligomers form and increase in size, solubility in the liquid crystal host decreases inducing phase separation and local gradients in concentration. Low host viscosity induces an isotropic diffusion rate of oligomers towards denser polymer rich regions. Global minimization and/or reduction of the system's free energy occurs. As polymerization advances, the system first passes through a metastable region and then drifts to a spinodal region. Phase separation is controlled by liquid crystal and monomer concentration induced by polymerization rate. In later stages interfacial tension and diffusion of species control growth rate and shape of emerging structures. Minimization and/or reduction of liquid crystal surface energy favors substantially spherical structures. Hydrostatic pressure of liquid crystal is balanced by Laplacian pressure and interfacial tension, creating a dense polymer inclusive shell encapsulating the highly chiral liquid crystal. As a result, a swollen gel of core-shell scatterers is formed.

After emulsification mixing of the monomers (with photoinitiators) and chirally doped liquid crystal, UV curing is performed. This UV curing stabilizes the liquid crystal and polymer matrix. Prior to UV exposure, surfactant may be used to increase the surface energy of polymer gels around the liquid crystal.

In an example embodiment of this invention, there is provided a switchable window, comprising: first and second transparent substrates, each supporting a respective transparent conductive electrode; an electo-optical layer comprising a plurality of microcells dispersed in a connective polymer matrix, each said microcell comprising polymer stabilized highly chiral liquid crystal droplets encapsulated in a polymer inclusive shell; wherein the electro-optical layer is sandwiched between the first and second substrates, and between the respective transparent conductive electrodes. The polymer stabilized highly chiral liquid crystal droplets may comprise nematic liquid crystal doped with a chiral dopant. The chiral dopant may comprise first and second different chiral dopants, each chiral dopant having a different respective twist, so that the first and second chiral dopants provide for different twists relative to each other. The liquid crystal may form a double twist cylinder. The switchable window may be configured to form an electric field between the transparent electrodes, the electric field causing the polymer stabilized highly chiral liquid crystal droplets to align to put the switchable window in a transmissive ON state in which the switchable window is substantially transparent. A haze value for the switchable window in the transmissive state may be ≤6% (more preferably ≤4%, even more preferably ≤3%, and most preferably ≤2%) at a viewing angle(s) of 45 and/or 60 degrees from a normal viewing angle. The electro-optical layer may be an anisotropic or substantially anisotropic gel.

In an example embodiment of this invention, there is provided a switchable window, comprising: first and second transparent substrates supporting first and second transparent conductive electrodes, respectively; an anisotropic gel electro-optical layer comprising a plurality of cores dispersed in a connective polymer based matrix, each said core comprising chiral doped liquid crystal and being encapsulated in a polymer inclusive shell; wherein the anisotropic gel electro-optical layer is sandwiched between the first and second substrates, and between the first and second transparent conductive electrodes; wherein the switchable window is configured to form an electric field between the first and second transparent conductive electrodes, the electric field for causing the liquid crystal to substantially align to put the anisotropic gel electro-optical layer in a transmissive ON state in which the switchable window is substantially transparent; wherein np<nc<ns for all angles of incidence from 0-80 degrees in the ON state, where np, nc and ns are the effective refractive indices of the polymer, core, and shell, respectively; and wherein across angles of incidence ranging from 0 to 80 degrees in the ON state of the electro-optical layer each of np, nc, and ns do not change by more than 0.1.

In an example embodiment of this invention, there is provided a method of making an electro-optical material including an anisotropic gel, the method comprising: preparing a monomer and photinitiator solution by mixing a predetermined amount of at least one monomer with a predetermined amount of a photoinitiator; preparing a chirally doped liquid crystal solution by mixing a nematic liquid crystal solution with a chiral dopant; mixing the monomer and photoinitiator solution with the chirally doped liquid crystal solution; incubating the mixture of the monomer and photoinitiator solution and chirally doped liquid crystal solution; and cooling the incubated mixture to form the anisotropic gel. The chiral dopant may comprises a first chiral dopant and a second chiral dopant, the first and second chiral dopants having different chiralities.

In an example embodiment of this invention, there is provided an electro-optical material comprising: a plurality of microcells dispersed in a polymer matrix, each microcell comprising a polymer stabilized highly chiral liquid crystal material encapsulated in a polymer inclusive shell. The polymer inclusive shell may be substantially spherical. A thickness of the polymer inclusive shell may be in a range of 0.25 to 1 μm. A diameter of the liquid crystal material encapsulated in the polymer inclusive shell may be in a range of 1 to 10 μm. The liquid crystal material may comprise a blue phase liquid crystal material comprising a plurality of double twist liquid crystal cylinders arranged in a matrix. The electro-optical material may be an anisotropic or substantially anisotropic gel.

BRIEF DESCRIPTION OF THE DRAWINGS

The above and other aspects, features and attendant advantages of the present disclosure will be apparent and more readily appreciated from the following detailed description, taken in conjunction with the accompanying drawings, in which like reference numerals refer to like elements, and wherein.

DETAILED DESCRIPTION

Figure 1:
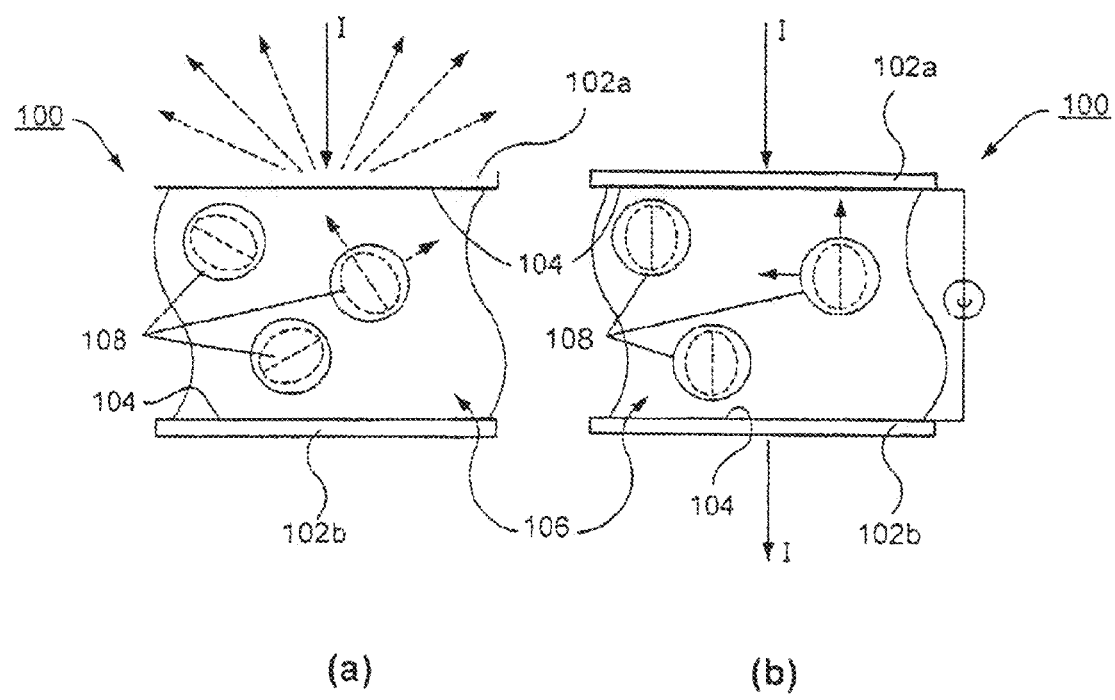
FIGS. 1(*a*) and 1(*b*) are diagrams illustrating a configuration of a conventional polymer dispersed liquid crystal in a switchable window.
Figure 2:
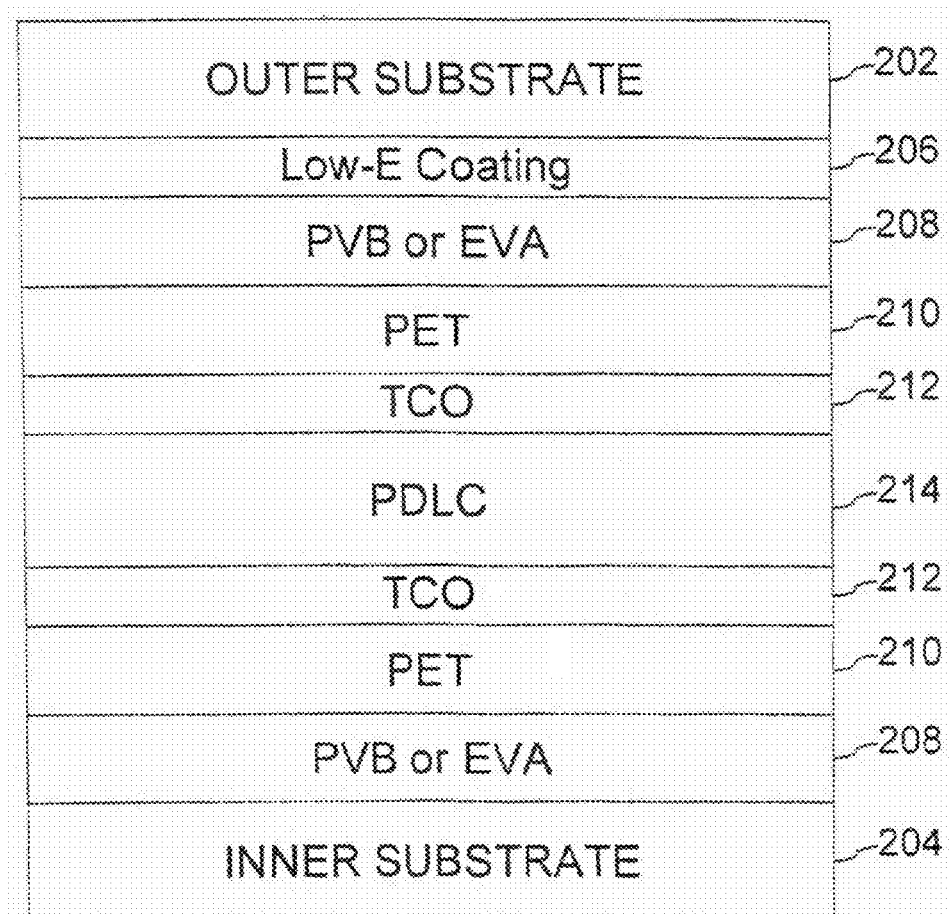
FIG. 2 is a diagram illustrating a structure of a conventional polymer dispersed liquid crystal switchable window.

Various example embodiments of the present disclosure will be described in greater detail herein with reference to the accompanying drawings.

There exists a simple relationship between the maximum viewing angle (θ, φ), size S of window and perpendicular distance of viewer from window. One can approximate the solid angle subtended by a small facet of window having a flat surface area dS, orientation n̂, and distance r from the viewer as:

$$d\Omega = 4\pi(dS/A)(\hat{r}\cdot\hat{n})$$

where the surface area of a sphere is A=πr². The solid angle for an arbitrary oriented surface S subtended at a point P is equal to the solid angle of the projection of the surface S to the unit sphere with center P, which can be calculated as the surface integral:

$$\Omega = \int\int_S \frac{\hat{r}\cdot\hat{n}dS}{r^2} = \int\int_S \sin\theta d\theta d\varphi$$

The projected haze onto the viewer is proportional to the solid angle. Consequently the haze increases with solid angle which in turn varies linearly with window size and is inversely proportional to the square of the distance from the window. Optically though the origin of the angular haze is related to the mismatch of the average refractive index <n> of the birefringent liquid crystal and the polymer as a function of wavelength and angle and the density of interfaces. While the match is near optimal at normal angle, the mismatch increases as a function of viewing angle.

In conventional PDLC arrangements, the residual haze in the ON state at normal incidence is related to layer thickness, droplet size as well as droplet density of the LC.

In the off state, a more accurate expression for the LC refractive index is $$n_{iso} = \sqrt{(2n_o^2 + n_e^2)/3},$$

which can be approximated by (2no+ne)/3 which is not tuned to the polymer refractive index $n_p$. In conventional PDLC arrangements, the polymer matrix refractive index is substantially a constant and therefore scattering of light is prevalent. In the On state and at normal incidence the refractive index of the LC is theoretically matched to that of the polymer and the light proceeds unscattered. However, some LC molecules by virtue of position at the periphery of the spheroids are at oblique angles while others are anchored at disclinations and consequently do not align themselves parallel to the field at the drive frequency. So even at normal incidence there is residual haze. However at angles other than normal incidence the mismatch in refractive indices between polymer and LC increases as the square of the sine of the angle, resulting in increasing angular haze in the transmissive state.

The present disclosure provides a solution to the above problems and drawbacks associated with conventional PDLC designs. According to the present disclosure, a highly chiral liquid crystal, for example, in the blue phase, is encasulated in a polymer inclusive shell and anchored in a polymer matrix. For ease of description, the disclosure may refer to blue phase liquid crystal (BPLC) as an example of highly chiral liquid crystal. However, it will be understood by those of ordinary skill in the art that the disclosure is not limited to BPLC, and encompasses any polymer stabilized highly chiral liquid crystal exhibiting the properties discussed herein. The matching of indices is such that the isotropic average refractive index of the liquid crystal blue phase is tuned to that of the polymer encapsulant when there is zero electric field condition. However, when an electric field is present, the liquid crystal molecules align in each domain resulting in an induced birefringence and there is a mismatch in refractive index between the polymer matrix and the encapsulated liquid crystal blue phase.

$$n_{average} \approx \frac{2n_o(E) + n_e(E)}{3} \approx n_p \quad E = 0 \text{ CLEAR}$$

$$\delta n = n_{iso} - n_o(E) = \frac{n_e(E) - n_o(E)}{3}$$

$$\frac{n_p(E) - n_o(E)}{3} \quad E > 0 \text{ SCATTERED}$$

$$\Delta n_{ind} = n_e(E) - n_o(E) = \lambda KE^2, \rightarrow \text{Electro-Optic Effect}$$

The EO-PLC is optically isotropic in the voltage-off state and its refractive index is equal to the polymer host. When an electric field is applied, birefringence is induced with the long axis along the electrical field. The induced birefringence is due to the local re-orientation of the molecules. Thus, average refractive index keeps substantially constant at any given electric field.

Here, $n_{iso}$ is the refractive index in voltage-off state. $n_o(E)$ and $n_e(E)$ are the field dependent refractive index perpendicular and parallel to the electric field, respectively.

The induced birefringence ($\Delta n_{ind}$) of blue phase liquid crystal under an external electric field is governed by Kerr effect as: 2Δnind=ne (E)−no (E)=λKE, (3) where is the wavelength, K (is the Kerr constant, and E is the amplitude of the electric field).

The present disclosure provides a novel LC arrangement comprising an anisotropic or substantially anisotropic gel of stabilized highly chiral, e.g., blue phase, liquid crystal encapsulated in, for example, a mesogenic polymer system shell, that forms a self-assembled, three-dimensional photonic crystal that remains electro-optically switchable under a moderate applied voltage (e.g., electric field). We start with an LC with high angular birefringence (from say 1.51 to 1.75) and then dope it, via chiral dopant(s), to form a highly chiral LC system which has substantially smaller angular birefringence (when the device is in the ON state) than undoped LC. In certain example embodiments, the window has a visible transmission of at least 60% (more preferably at leat 70%, and most preferably at least 80%) when the highly chiral LC layer is in the ON/transmissive state. In certain example embodiments, the electro-optical layer may have a birefringence of from about 0.23 to 0.33, more preferably from about 0.26 to 0.29, at 550 nm.

For example, the liquid crystal arrangement may be achieved via a polymer-assembled blue phase liquid crystal system having a substantially continuous polymer structure case surrounding well-defined discrete bodies of liquid crystal material arranged in a cellular manner. These assembled structures globally connect to form a matrix.

The cells of liquid crystal material exhibit a poly domain operating state in which the liquid crystal material within each body is arranged in multiple domains, each domain being defined by a quantity of liquid crystal material whose molecules have a substantially common identifiable small helicoidal pitch in at least one axis, wherein the resolved alignments of neighboring domains diverge substantially from one another and are stable over time. Upon the application of an electric field, the liquid crystal molecules in each domain take a similar configuration such that the electro-optic properties of the system matches that of the polymer host and the system becomes transparent and has very low residual haze in the transmissive state (e.g., in the range of, for example, less than 4% across a broad range of viewing angles, e.g., 60° or more).

The polymer-assembled blue phase liquid crystal droplets (e.g., blue phase liquid crystal or stabilized highly chiral liquid crystal, encapsulated in a polymeric shell) can also be arranged in electro-optical films with both perpendicular to pane and in-plane electric field switching. For example, films may be prepared via solvent evaporation-induced phase separation of a mixture of blue phase liquid crystal (BPLC) and polymer. The film may be coated directly on, for example, glass or PET, laminated between two coated conductive substrates (e.g., ITO coated conductive substrates), and enable switching between light-scattering and transparent states in response to electric fields applied across the film.

Figure 3:
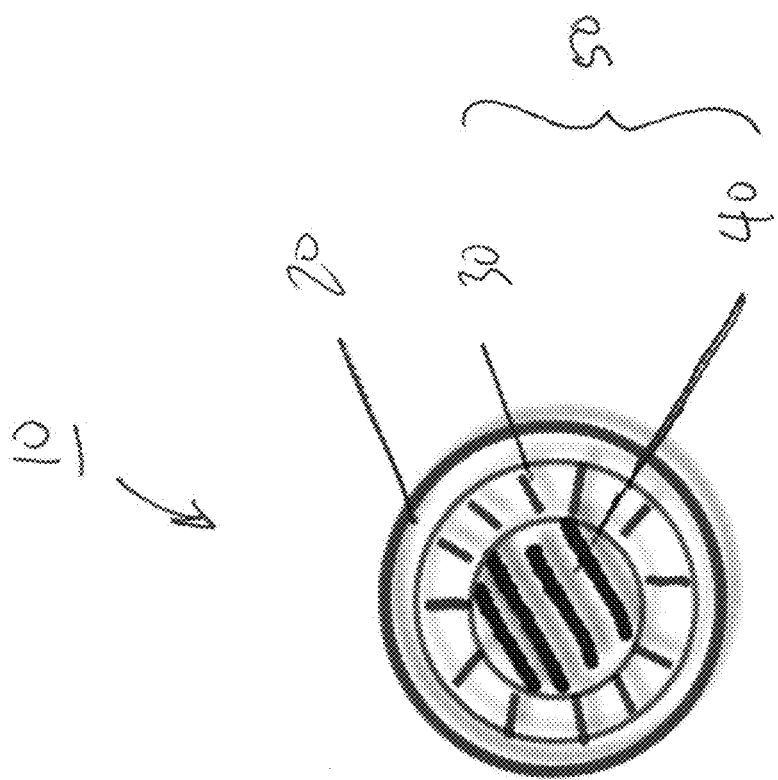
FIG. 3 is a diagram illustrating an example configuration of a core-shell scatterer including a hypertwisted liquid crystal formed using two chiral dopants according to an example embodiment of the present disclosure.

FIG. 3 is a diagram illustrating an example of polymer stabilized highly chiral liquid crystal encapsulated in a polymer inclusive shell, such as, for example, and without limitation, a mesogenic polymer inclusive shell.

In this example, the BPLC encapsulated in a polymer inclusive shell may be referred to as a microcell 10. The microcell 10 comprises a polymer inclusive shell 20, such as, for example, and without limitation, a mesogenic polymer inclusive shell. The polymer inclusive shell 20 may be substantially spherical and encapsulates the polymer stabilized highly chiral liquid crystal, e.g., BPLC 50. The polymer stabilized highly chiral liquid crystal, e.g., BPLC 50 includes a nematic liquid crystal material having two chiral dopants 30, 40, which induce twisting in the otherwise nematic liquid crystal material. As will be discussed below in greater detail, the addition of these chiral dopants induces twist in the nematic liquid crystal that causes the chirally doped liquid crystal to form a lattice or matrix of double twist cylinders that provide the stabilized highly chiral liquid crystal (e.g., BPLC). Using two different chiral dopants facilitates the double twist and self-arrangement into double twist cylinders. In this example, the chirally doped liquid crystal material 40 may include, for example, and without limitation, MDA 3506, available from Merck, which has as its main constituent 4-((4-ethyl-2,6-difluororophenyl)-ethinyl)-4'-propylbiphenyl and 2-fluoro-4,4'-bis(trans 4-propylcyclohexyl)-biphenyl. The chirally doped liquid crystal material 30 includes E7, also available from Merck, and includes 4-cyano-4'-n-puntyl-biphenyl, 4-cyano-4'-n-heptylbiphenyl, 4-cyano-4'-n-oxyoctyl-biphenyl, 4-cyano-4"-n-pentyl-p-terphenyl. In this example, the chirally doped liquid crystal 40 includes a chiral dopant (twister) SLI3786 (S811), also available from Merck. The chiral dopant used in chirally doped liquid crystal material 30 may include ZLI4571, available from Merck. This provides for reduction of angular birefringence of highly chiral LC systems, which allows for a reduction in haze at large viewing angles such as at viewing angles of 45 and/or 60 degrees from normal.

The microcell 10 thus includes a lattice of double twist cylinders comprising nematic liquid crystal materials chirally doped with different dopants having different chiralities to induce formation of the double twist cylinders and self-alignment of the cylinders into a lattice or matrix of double twist cylinders that comprise, for example, a blue phase liquid crystal that is encapsulate in the polymer inclusive shell 20.

Figure 4:
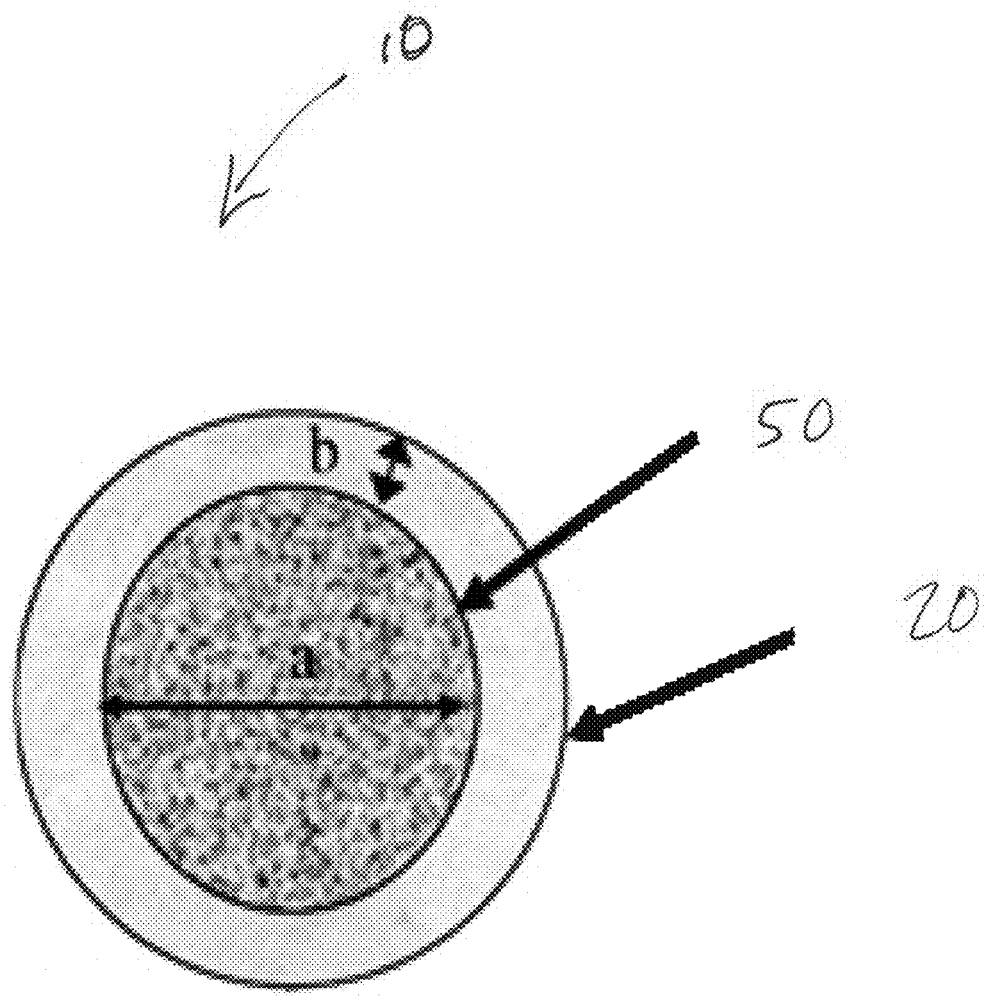
FIG. 4 is a diagram illustrating an example core-shell scatterer according to an example embodiment of the present disclosure.

FIG. 4 is a diagram illustrating an example core-shell scatterer according to an example embodiment of the present disclosure.

As illustrated in FIG. 4, the microcell 10 includes the polymer inclusive shell 20 encapsulating, for example, BPLC 50. In this example, the microcell 10 is substantially spherical. A thickness b of the polymer inclusive shell 20 may, for example, and without limitation, be in a range of 0.25 to 1 µm, and the diameter a of the BPLC 50 encapsulated within the polymer inclusive shell 20 may, for example, and without limitation, be in a range of 1-10 µm. The microcell 10 illustrated in FIG. 4 may result from following the example method of making encapsulated BPLC discussed below.

The threshold voltage of the BPLC is proportional to the thickness b of the polymer inclusive shell 20 and the diameter a of the BPLC 50 (b/a), the ratio of liquid crystal to polymer dielectric constants (>>1) and interfacial charge.

The BPLC encapsulated in the polymer inclusive shell may be achieved by mixing a stabilized hypertwisted liquid crystal with a monomomer mixture including one or more monomers and a photoinitiator. The hypertwisted liquid crystal may be formulated by mixing a nematic liquid crystal material with one or more chiral dopants (which may be referred to herein as "twisters") that result in a stabilized hypertwisted liquid crystal. When the stabilized hypertwisted liquid crystal and monomer mixture are mixed, the result is bi-stable state of liquid crystal comprising a plurality of discrete spheroidal bodies of hypertwisted chiral nematic liquid crystal microencapsulated by a polymer inclusive shell (micro-cells). The introduction of chiral dopants to the nematic liquid crystal causes twisting of the liquid crystal. The hypertwisted liquid crystal may then form a self-assembled, three-dimensional photonic crystal that remains electro-optically switchable under a moderate applied voltage. This arrangement of liquid crystals is referred to herein as BPLC. The resulting blue phase liquid crystal encapsulated in the polymer inclusive shell may be referred to herein as a core-shell scatterer. In short, a scatterer 10 comprises a core of immiscible nematic liquid crystal and chiral dopant (twisters) 50 encapsulated in a polymer inclusive shell 20. The core-shell scatterers may be disbursed in a polymer scaffold or connective polymer matrix as illustrated in FIG. 5.

Figure 5:
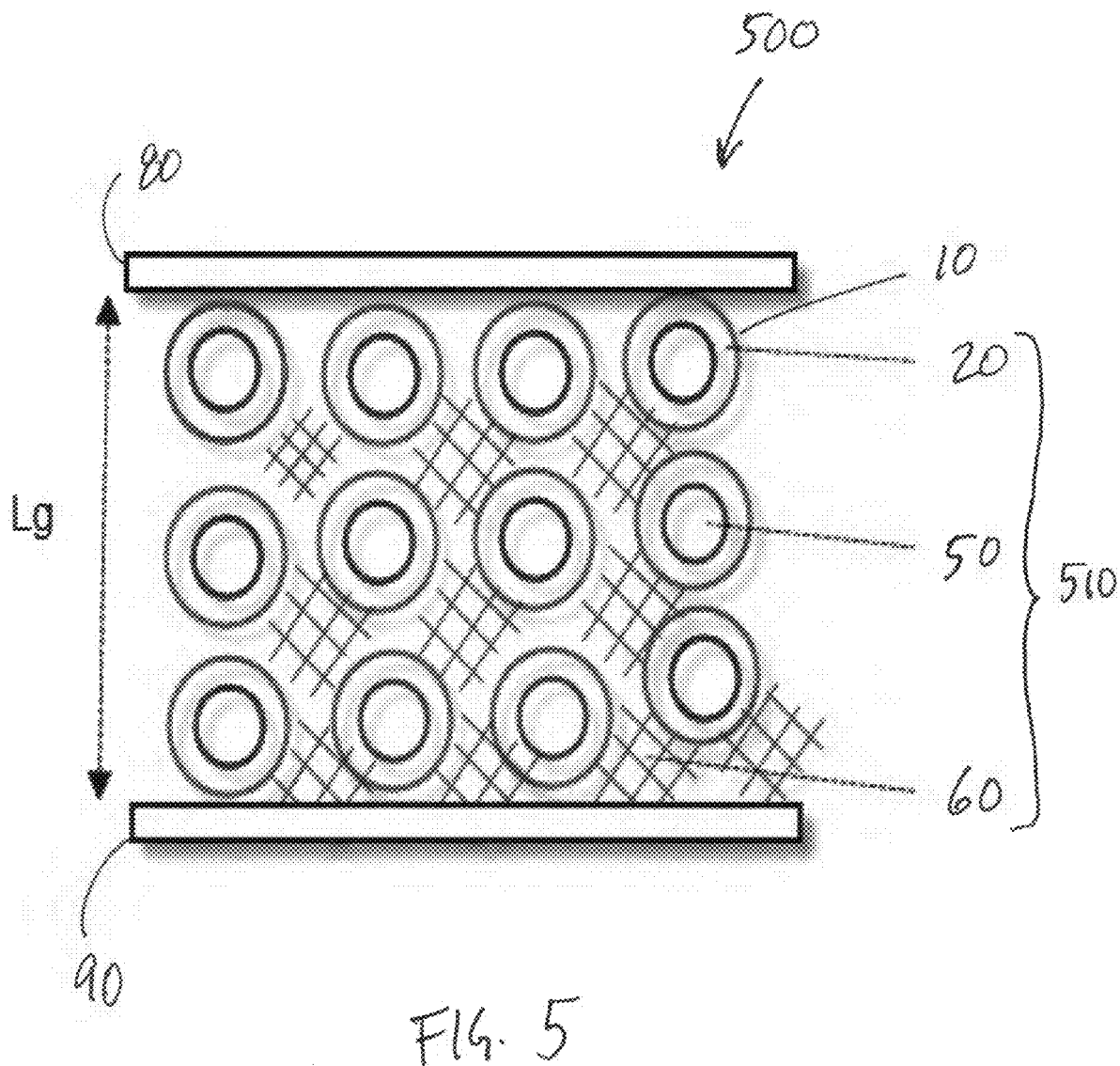
FIG. 5 is a diagram illustrating an example configuration of a switchable window including core-shell scatterers encapsulated in a polymer inclusive shell according to an example embodiment of the present disclosure.

FIG. 5 is a diagram illustrating microcells or core-shell scatterers disbursed in a polymer scaffold or connective polymer matrix and sandwiched between two substrates according to an example embodiment of the present disclosure.

As illustrated in FIG. 5, an example switchable window 500 may include two substrates 80, 90. The substrates 80, 90 may be transparent and made of, for example, and without limitation, glass, PET, or the like. The substrates 80, 90 may each also include a transparent electrode (not shown) disposed on a surface of the substrates 80, 90 facing an interior space of the switchable window. Thus, for example, each substrate 80, 90 for example may be made up of a glass substrate with an ITO electrode thereon facing the electro-optical layer 510. The transparent electrode may comprise, for example, and without limitation, a transparent conductive oxide, such as, for example, and without limitation indium-tin-oxide (ITO). In certain example embodiments, each of the transparent conductive electrode has a dielectric layer (e.g., silicon dioxide, silicon oxynitride, and/or silicon nitride) on the surface of the electrode so as to be located between the electrode and the electro-optical layer 510. Thus, for example, each substrate 80, 90 for example may be made up of a glass substrate with an ITO electrode and such a dielectric layer thereon facing the electro-optical layer 510. It has been found that the presence of the dielectric layer, of or including a material such as silicon oxide, silicon nitride, and/or silicon oxynitride, between at least one of the electrodes and the electro-optical layer 510 advantageously reducing arcing/short circuits during application of voltage. Power may be supplied to the transparent electrode(s) to induce an electric field to control the transmissivity of the electro-optic material 510 sandwiched between the two substrates 80, 90. The electro-optic material may be referred to herein as an electro-optical element.

The electro-optical layer 510 comprises a plurality of microcells (scatterers) 10 which, as described above, may include a BPLC 50 encapsulated by a polymer inclusive shell 20. The plurality of microcells 10 may be dispersed, for example, in a connective polymer matrix 60. Lg denotes the thickness of the electro-optic element 510 (or cell gap), and Lg is preferably from about 9-17 μm (more preferably from about 10-15 μm) in example embodiments of this invention. The anisotropic gel electro-optical layer 510 is anisotropic in both the ON and OFF states, but application of voltage can reduce the anisotropy of the layer 510. The anisotropic gel electro-optical layer 510 is a solid state layer, but is not rigid. The gel nature of the anisotropic gel electro-optical layer 510 results in a solid state layer in the form of a gel that has a spongy feel and viscosity—this layer 510 is not a liquid.

The core-shell scatterers 10 disbursed on a polymer scaffold or connective polymer matrix 60 may be arranged in an electro-optical layer 510 sandwiched between two substrates 80, 90 having electrodes disposed on inward facing surfaces thereof. For switchable applications, such as a switchable window, the micro-cells 10 are selectively operable in at least two states. In a first state, light is transmitted through a liquid crystal body, and in a second state, light is scattered and absorbed by the liquid crystal body. Each body in the second state has an ordered liquid crystal texture that minimizes and/or reduces disclinations or domains within the liquid crystal body. The liquid crystal texture comprises a superstructure of hyper twisted chiral nematic liquid crystal.

In operation, the switchable window 500 is substantially opaque, e.g. having a haze of 100%±3%, in the OFF state, e.g., when no voltage is applied to the transparent electrodes. When voltage is applied to one or more of the transparent electrodes, the switchable window 500 is transmissive. By virtue of use of the BPLC 50 in the microcells 10, the resulting switchable window 500 exhibits very low haze, e.g, <4%, even at substantially large viewing angles, in the transmissive state. It will be understood that the ON and OFF states of the electro-optical element 500 may operate differently, and the states described above are by way of illustration only.

Use of a core-shell scatterer arrangement instead of molecular birefringence addresses and overcomes issues associated with mismatch of indices of refraction due to, for example, peripheral nematogens. Use of a very small pitch chiral BPLC as the scatter core may be preferred. The pitch depends on both twisting power and concentration of the chiral dopants used to make the BPLC. Using mixtures of nematic liquid crystals and chiral dopants provides several advantages, including, for example, and without limitation, inducing immiscibility gap at ambient conditions; increasing opacity in the off (non-transmissive) state due to random birefringence in the off state; and ability to tune birefringence with an applied electric field so that angular on (transmissive) state haze is low (e.g., <4%).

Figure 10:
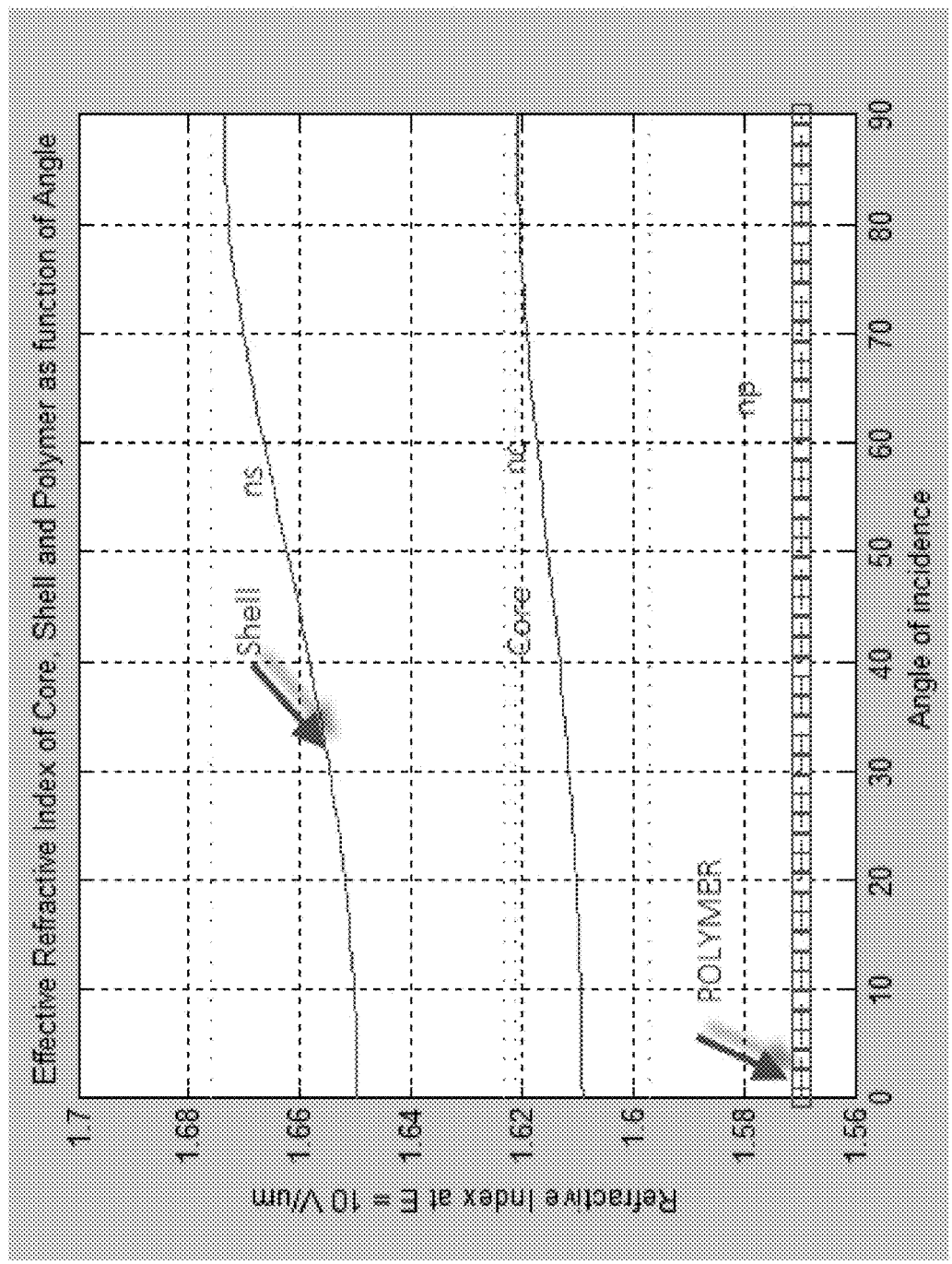
FIG. 10 illustrates the effective refractive indices of the core (nc), shell (ns), and the polymer (np) according to an example embodiment in the ON state when voltage is applied, as a function of angle.
Figure 11:
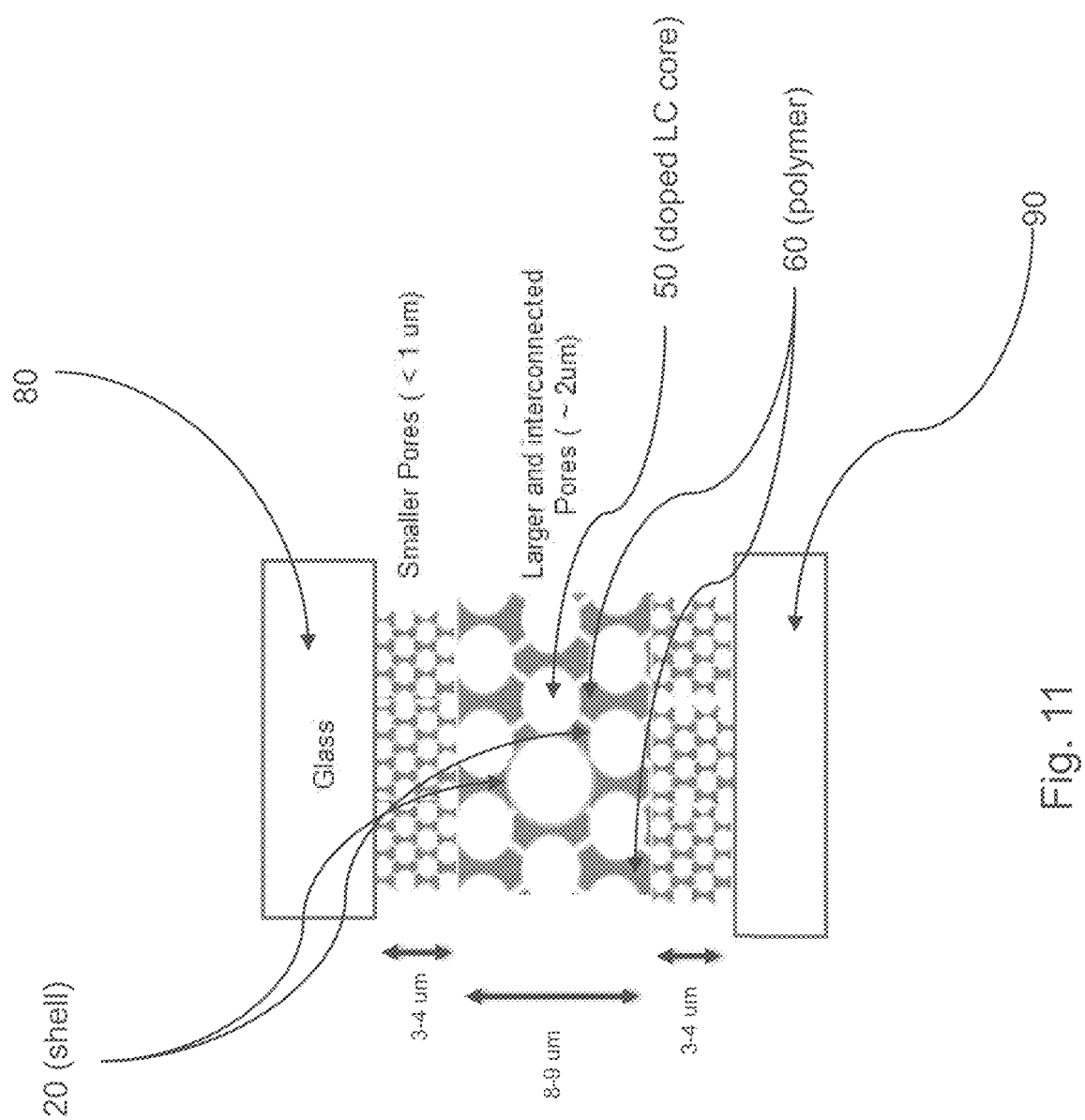
FIG. 11 is a cross sectional view illustrating an example configuration of a switchable window including core-shell scatterers encapsulated in a polymer inclusive shell according to an example embodiment of the present disclosure.

FIG. 11, similar to FIG. 5, is a cross sectional view illustrating an example configuration of a switchable window according to an example embodiment of the present disclosure. FIG. 11 illustrates first and second transparent substrates (80, 90, in any order) that support first and second transparent conductive electrodes, respectively, and the anisotropic gel electro-optical layer between the substrates 80, 90. The solid state anisotropic gel electro-optical layer includes many chiral doped LC cores 50 dispersed in a connective polymer based matrix 60, where each core 50 is encapsulated in a shell 20 that may be a mixture of polymer and LC. The switchable window is configured to form an electric field between the first and second transparent conductive electrodes and thus between the substrates 80 and 90, the electric field for causing liquid crystal of the gel to substantially align to put the anisotropic gel electro-optical layer in a transmissive ON state in which the switchable window is substantially transparent. As shown in FIG. 10, np<nc<ns for all angles of incidence from 0-80 degrees in the ON state, where np, nc and ns are the effective refractive indices of the polymer 60, core 50, and shell 20 areas, respectively. The dark areas 60 in the anisotropic gel layer in FIG. 11, between the substrates, indicate the connective polymer matrix in which the cores and shells are located. Note also that the connective polymer matrix 60 shown in FIG. 11 extends between cores/pores 50 and contacts the substrates 80, 90 (or layers thereon such as electrodes or dielectric layers). As explained herein, across angles of incidence ranging from 0 to 80 degrees in the ON state of the electro-optical layer each of np, nc, and ns do not change by more than 0.1 as shown in FIG. 10, thereby allowing the window to realize significantly reduced haze compared to conventional PDLC windows.

FIG. 11 also illustrates that the cell gap may be made up of a large core/pore area in the middle region, and a small core/pore area in the regions adjacent the substrates 80, 90. The cores/pores may be at least 50% larger in the middle region on average, compared to in the small core/pore areas/regions adjacent the substrates, in certain example embodiments of this invention.

Figure 6:
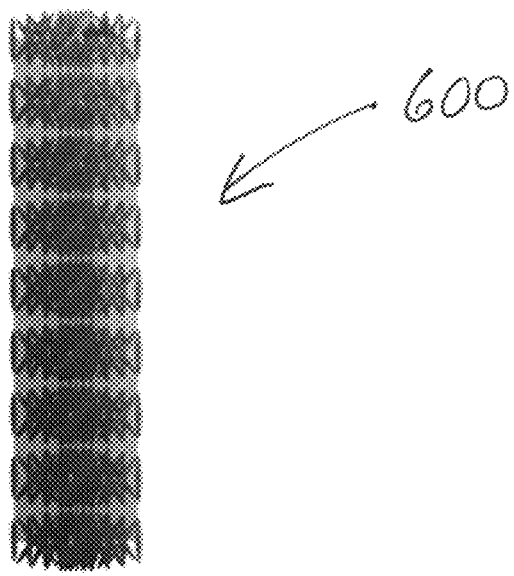
FIG. 6 is a diagram illustrating a double twist cylinder arrangement of chirally doped nematic liquid crystal that form a BPLC according to an example embodiment of the present disclosure.

FIG. 6 is a diagram illustrating a double twist cylinder arrangement of liquid crystals created by introducing chiral dopants to a nematic liquid crystal, according to an example embodiment of the present disclosure.

Figure 7:
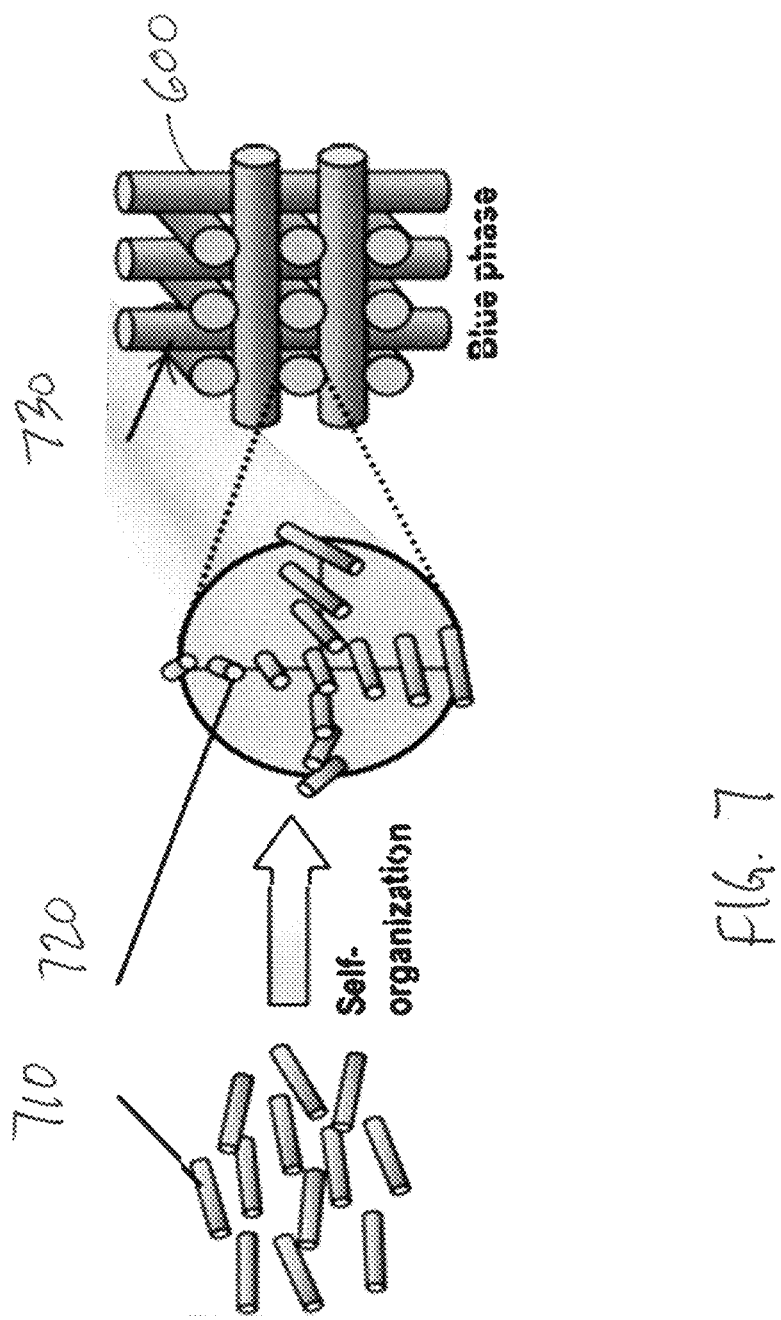
FIG. 7 is a diagram illustrating an example process of forming a self-assembled, three-dimensional photonic crystal of double twist cylinders of chirally doped nematic liquid crystal that form a BPLC according to an example embodiment of the present disclosure.

Typically, liquid crystals are made from rod-like molecules that line up in at least one direction while remaining mobile and disorderly in other directions. For example, in BPLC, this alignment of molecules takes a more complicated form. The liquid crystal molecules, by virtue of the addition of chiral dopants (twisters) assemble into cylindrically shaped arrays in which the direction of alignment twists in a helix, while the helices themselves criss-cross in three dimensions, and the structure repeats regularly every several hundred nanometers. FIG. 6 illustrates a double twist cylinder of liquid crystal molecules 600. These cylinders 600 may then criss-cross in three dimensions to form a lattice or matrix of double twist cylinders as illustrated in FIG. 7 below. This results in a self-assembled, three-dimensional photonic crystal that remains electro-optically switchable under a moderate applied voltage (e.g., electric field). The matrix of double twist cylinders comprises the core 50 of the core shell scatterer 10. As noted above, the core-shell scatterers may be disbursed in a polymer scaffold or connective polymer matrix 60.

FIG. 7 is a diagram illustrating an example process of forming a lattice or matrix of double twist cylinders according to an example embodiment of the present disclosure.

Referring to FIG. 7, nematic liquid crystal molecules 710 may be mixed with one or more chiral dopants as described above. In this example, use of two different chiral dopants having differing chiralities is preferred. After being mixed with the chiral dopants, the chirally doped liquid crystal molecules (highly chiral liquid crystal) may self-assemble into cylindrically shaped arrays or double twist cylinders 600 in which the direction of alignment twists in a helix 720, while the helices themselves criss-cross in three dimensions to form a lattice or matrix 730 of double twist cylinders 600. The result is a highly chiral liquid crystal, e.g., BPLC, having a lattice or matrix structure that provides superior optical performance as compared to conventional PDLC arrangements.

Figure 8:
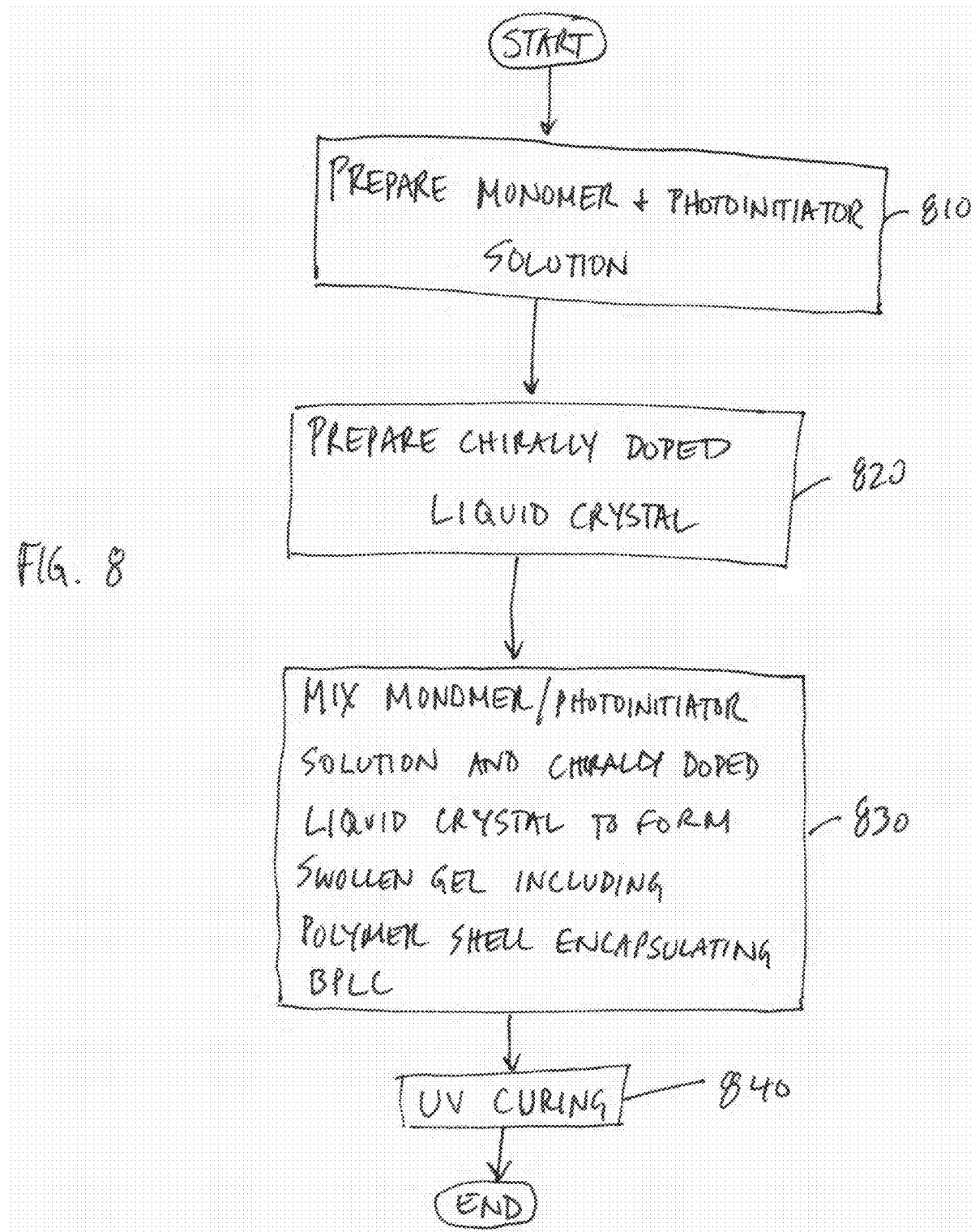
FIG. 8 is a flowchart illustrating an example process for making an anisotropic gel of BPLC core-shell scatterers according to an example embodiment of the present disclosure.

FIG. 8 is a flowchart illustrating an example method of making a polymer-stabilized highly chiral liquid crystal that is encapsulated in a polymer inclusive shell, according to an example embodiment of the present disclosure, and FIG. 10 illustrates the effective refractive indices, when the electro-optical layer is in the ON state, of the core (nc), shell (ns), and the polymer (np) according to an example embodiment, as a function of angle (at 550 nm). Note that the effective refractive index values nc, np and ns in FIG. 10 are in the ON state, and that when in the OFF state n would essentially be neff and scattering be due to focal conics. Example embodiments relate to making an anisotropic gel by mixing LC+high twisting dopants+polymer network casing. The casing may be substantially spherical or spherical in example embodiments. Note that "substantially spherical" means spherical plus/minus 15%. A simplified model makes the assumption that they are spherical.

$$n_{eff}(\theta, V) = \left( \frac{\cos^2(\theta)}{n_o^2(V)} + \frac{\sin^2(\theta)}{n_e^2(V)} \right)^{-1/2}.$$

$$neff^\wedge 2 = (no^\wedge 2 + ne^\wedge 2)/2$$

In certain example embodiments, as shown in FIG. 10 for instance, np<nc<ns at all angles of incidence from 0-80 degrees, when the electro-optical layer is in the ON state. The ON state is when voltage is applied thereto, and the layer is in the transmissive state. In certain example embodiments, at all angles of incidence from 0-80 degrees in the ON state as shown in FIG. 10, ns is from 1.62 to 1.71 (more preferably from 1.63 to 1.69), nc is from 1.57 to 1.66 (more preferably from 1.58 to 1.64), and np is from 1.52 to 1.60 (more preferably from 1.52 to 1.59, and most preferably from 1.52 to 1.58). These values allow haze to be reduced in switchable window applications, in the ON state. Conventional PDLC switchable windows use liquid crystal layers that experience a large change in effective refractive index from about 1.51 to about 1.77 going from 0 to 90 degrees angle of incidence, which results in significant haze in the window. In contrast, in example embodiments of this invention as shown in FIG. 10 for example, moving across the range from 0 to 80 degrees angles of incidence in the ON state of the electro-optical layer: (i) ns does not change by more than 0.1, more preferably by not more than 0.05, and most preferably by not more than 0.04; (ii) nc does not change by more than 0.05, more preferably by not more than 0.03, and most preferably by not more than 0.02; and (iii) np does not change by more than 0.05, more preferably by not more than 0.03, and most preferably by not more than 0.02. These values, indicating stability across a large range of angles of incidence and thus viewing angles, surprisingly and unexpectedly allow haze to be significantly reduced in switchable window applications, in the ON state, compared to convention PDLC switchable windows.

In certain example embodiments, the ratio of polymer/LC is from about 8-30%, more preferably from about 10-20%, before and/or after phase segregation of the mixture into the anisotropic gel of polymer stabilized highly chiral liquid crystal. Such a range has been found to result in improved haze reduction and stability in the ON state of the window.

Moreover, in certain example embodiments, polymer distribution in the gel layer 510 in the window is graded and not uniform. For example, there may be more polymer in the middle plane between the electrodes and less immediately adjacent the electrodes, and conversely the LC is also graded such that there is less LC immediately adjacent the electrodes and more LC in the middle plane of layer 510. In certain example embodiments, the polymer-rich regions close to the respective substrates 80, 90 may be about 10-30 nm thick, with substantially the remainder of the layer 510 being LC-rich. Again, these features have been found to improve haze reduction in the window.

Referring to FIG. 8 one non-limiting example method of making a polymer stabilized highly chiral liquid crystal, such as, for example, BPLC includes preparing a monomer solution for subsequent mixture with a chirally doped liquid crystal mixture and performing emulsification mixing of the two solutions.

For example, in operation 810, a first monomer, for example, EHMA (ethylhexyl methacrylate) is weighed and added to a second monomer, for example TMPTMA (trimethylolpropane triacrylate) and a photoinitiator, for example, IRG 651 available from Ciba Additive, Inc., for use in subsequent UV curing. To ensure proper mixture, shaking the solution for 10 or more minutes may be preferable. This solution may then be stored for later mixture with the liquid crystal solution.

In operation 820, the chirally doped liquid crystal solution may be prepared. As an illustrative example, one may measure and weigh up to three liquid crystal solutions, for example, and without limitation, E7, MLC 6080 and MDA 3506 all available from Merck and discussed in detail above. To provide the proper chiral doping to the LC mixture, two different chiral dopants may be added. These dopants may, for example, and without limitation, include ZLI 3786 and ZLI 4571, both available from Merck. This solution may then be stored for later mixture with the monomer/photoinitiator solution.

In operation 830, the monomer/photoinitiator solution from operation 810 may be mixed with the chirally doped liquid crystal solution from operation 820. An example condition for mixing these solutions is to mix the solutions at room temperature and incubate the mixture in a hot water beaker bath at 70° C. for approximately 5 mins. The incubated solution may then be cooled down, for example ramping down 0.5° C./min. to 50° C. and then at 2° C./min. to room temperature. Thus, there is a process of incubation that is used to first dissolve the liquid crystal (LC) and the dopants. This is taken to above the Tg of the LC and then cooled down at rate that favors the formation of the blue phase (BP). The monomers and PI are then added so as to stabilize and then curing phase segregate. One still has some oligomers in the BP (in the disclinations) and the rest of the polymer is then around these structures to provide a bulk modulus so that we have an anisotropic or substantially anisotropic gel. This is utilized given that this material is solid state soft matter, but non-liquid.

As described in detail above, an example way to make polymer stabilized highly chiral liquid crystal, e.g., BPLC, may include forming blue phase liquid crystal by adding chiral dopants to a nematic or core bent liquid crystal host. Preferably, the liquid crystal host has a wide nematic range. Chiral dopants introduce high chirality to the nematic liquid crystal host and induce blue phases. The pitch length (p) is inversely proportional to the helical twisting power (HTP) and concentration (c) of the chiral dopant. For example, $p=1/(HTP \times c)$. Therefore, pitch length, and hence Bragg reflection wavelength, can be tuned by choosing different chiral dopants or varying the concentration of the chiral dopant. Increasing chiral dopant concentration for a dopant having a weaker HTP may lead to some disadvantages, such as, for example, the ratio of nematic LC host molecules is lowered resulting in a lower Kerr constant, decreasing the clearing point of the BPLC, and saturation in pitch length. According to the present disclosure, adding two different chiral dopants to the liquid crystal host results in desirable BPLC properties. A small fraction of monomers and a photoinitiator are added to the BPLC, once the BPLC has been stabilized. The BPLC core-shell scatterers are formed by mixing the BPLC with monomers and photoinitiator, incubating the mixture in, for example, a hot water beaker bath, and cooling in a ramp down manner to room temperature as described above. Once polymerization is initiated, a non-equilibrium structure may occur in a manner dependent on competition between phase separation dynamics and reaction kinetics. As oligomers form and increase in size, solubility in the liquid crystal host decreases inducing phase separation and local gradients in concentration. Low host viscosity induces an isotropic diffusion rate of oligomers towards denser polymer rich regions. Global minimization and/or reduction of the system's free energy occurs. As polymerization advances, the system first passes through a metastable region and then drifts to a spinodal region. Phase separation is controlled by liquid crystal and monomer concentration induced by polymerization rate. In later stages interfacial tension and diffusion of species control growth rate and shape of emerging structures. Minimization and/or reduction of liquid crystal surface energy favors substantially spherical structures. Hydrostatic pressure of liquid crystal is balanced by Laplacian pressure and interfacial tension, creating a dense polymer inclusive shell encapsulating the BPLC. As a result, a swollen gel of BPLC core-shell scatterers is formed.

Figure 9:
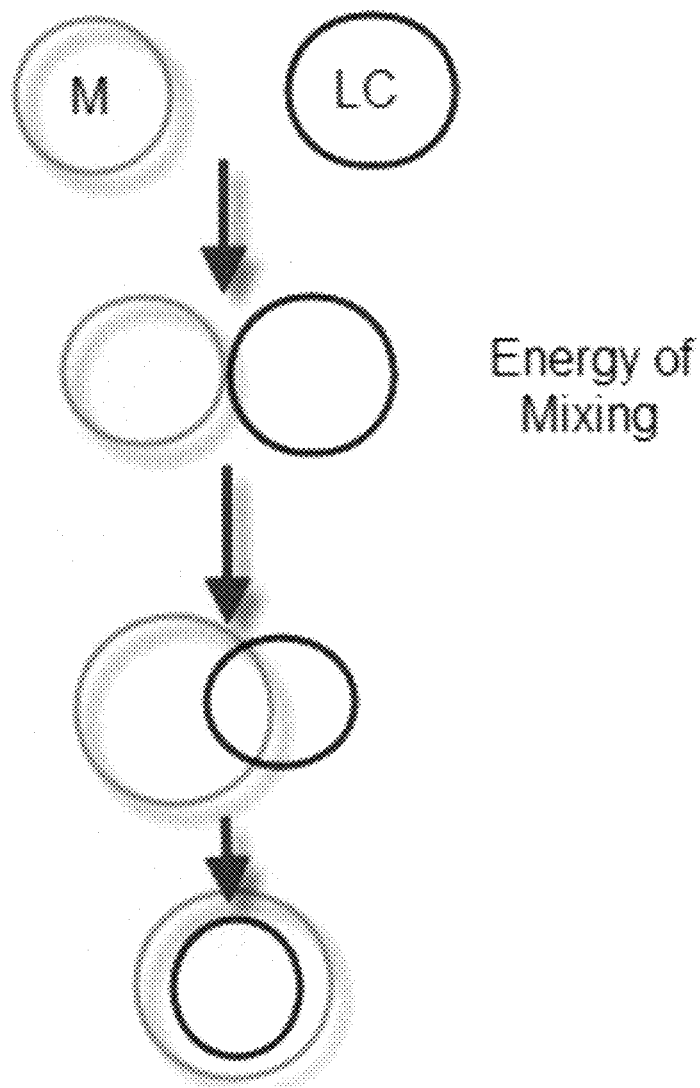
FIG. 9 is a diagram illustrating an example process by which polymer stabilized highly chiral liquid crystal is encapsulated in a polymer inclusive shell.

FIG. 9 is a diagram illustrating an example process by which the polymer stabilized highly chiral liquid crystal is encapsulated in a polymer inclusive shell according to an example embodiment of the present disclosure.

As illustrated in FIG. 9, when the monomer solution M is mixed with the highly chiral liquid crystal solution (denoted LC), the surface energy of the monomer is larger than that of the LC. As such, interfacial tension and diffusion of species control growth rate and the shape of the emerging structures. Minimization and/or reduction of LC surface energy favors the formation of spherical structures. In other words, the hydrostatic pressure of the LC is balanced by Laplacian pressure of the monomer and interfacial tension to create a dense polymer inclusive shell enclosing LC and a swollen gel of substantially spherical scatterers is formed.

As a result of emulsification mixing of the monomers (with photoinitiators) and chirally doped liquid crystal a swollen anisotropic gel including polymer inclusive shells encapsulating the polymer stabilized highly chiral LC is formed. This swollen gel may be introduced in between two transparent substrates to form a switchable window. The filling of the gap between the substrates with the swollen gel may be accomplished in various different ways, such as, for example, and without limitation, vacuum filling, capillary filling and drop fill. In each case to ensure proper formation of the swollen gel, vortex shaking of the total LC mixture (the result of operation 830) at for example, and without limitation at 2000 rpm for 10 minutes. UV curing is then performed in operation 840. This UV curing stabilizes the LC and polymer matrix. Prior to UV exposure, surfactant may be used to increase the surface energy of polymer gels around the liquid crystal.

The foregoing provides a electro-optical element comprising a plurality of microcells dispersed in a connective polymer matrix. The microcells (scatterers) comprise a polymer stabilized highly chiral liquid crystal such as BPLC encapsulated in a polymer inclusive shell. The polymer inclusive shell may be mesogenic. When used in a switchable window application, the disclosed electro-optical element provides a highly opaque switchable window in the non-transmissive (e.g., OFF) state having a haze value of 100%±3%. In the transmissive (e.g., ON) state, such a switchable window has a haze value of less than 4% even at very high viewing angles (e.g., ≥60°).

In an example embodiment of this invention, there is provided a switchable window, comprising: first and second transparent substrates, each supporting a respective transparent conductive electrode; an electro-optical layer comprising a plurality of microcells dispersed in a connective polymer matrix, each said microcell comprising polymer stabilized highly chiral liquid crystal encapsulated in a polymer inclusive shell; wherein the electro-optical layer is sandwiched between the first and second substrates, and between the respective transparent conductive electrodes.

In the switchable window of the immediately preceding paragraph, the polymer stabilized highly chiral liquid crystal may comprise nematic liquid crystal doped with a chiral dopant. The chiral dopant may comprise first and second different chiral dopants, each chiral dopant having a different respective twist, so that the first and second chiral dopants provide for different twists relative to each other.

In the switchable window of any of the preceding two paragraphs, the liquid crystal may form a double twist cylinder. A plurality of double twist cylinders may be arranged in a matrix structure.

In the switchable window of any of the preceding three paragraphs, the microcells may comprise blue phase liquid crystal comprising a plurality of double twist cylinders arranged in a matrix structure.

In the switchable window of any of the preceding four paragraphs, the switchable window may be configured to form an electric field between the transparent electrodes, the electric field causing the polymer stabilized highly chiral liquid crystal to align to put the switchable window in a transmissive ON state in which the switchable window is substantially transparent.

In the switchable window of any of the preceding five paragraphs, a haze value for the switchable window in the transmissive state may be ≤6% (more preferably ≤4%, even more preferably ≤3%, and most preferably ≤2%) at a viewing angle of 45 degrees from a normal viewing angle.

In the switchable window of any of the preceding six paragraphs, a haze value for the switchable window in the transmissive state may be ≤6% (more preferably ≤4%, even more preferably ≤3%, and most preferably ≤2%) at a viewing angle of 60 degrees from a normal viewing angle.

In the switchable window of any of the preceding seven paragraphs, a haze value of the switchable window in a non-transmissive state may be at least 90% (more preferably at least 95%) at substantially all viewing angles.

In the switchable window of any of the preceding eight paragraphs, a haze value of the switchable window in a non-transmissive state may be about 100%±3% at substantially all viewing angles.

In the switchable window of any of the preceding nine paragraphs, the polymer inclusive shell may be spherical or substantially spherical.

In the switchable window of any of the preceding ten paragraphs, a thickness of the polymer inclusive shell may be in a range of 0.25 to 1 µm.

In the switchable window of any of the preceding eleven paragraphs, a diameter of the liquid crystal material encapsulated in the polymer inclusive shell may be in a range of 1 to 10 µm.

In the switchable window of any of the preceding twelve paragraphs, the first and second transparent substrates may be glass substrates, or may be of or include PET.

In the switchable window of any of the preceding thirteen paragraphs, the electro-optical layer may be an anisotropic gel. The anisotropic gel electro-optical layer may be from about 9-17 µm thick.

In the switchable window of any of the preceding fourteen paragraphs, the window may have a visible transmission of at least 60%, more preferably of at least 70%, and most preferably of at least 80%, when the switchable window in the transmissive state.

In the switchable window of any of the preceding fifteen paragraphs, in the electro-optical layer a ratio of polymer/LC may be from about 10-30%.

In the switchable window of any of the preceding sixteen paragraphs, polymer distribution in the electro-optical layer need not be uniform, so that there may be a greater percentage of polymer, compared to liquid crystal, in a middle plane between the electrodes and a lesser percentage of polymer, compared to liquid crystal, immediately adjacent the electrodes.

In the switchable window of any of the preceding seventeen paragraphs, the np<nc<ns may be for all angles of incidence from 0-80 degrees, where np, nc and ns are the effective refractive indices of the polymer, core, and shell, respectively.

In the switchable window of any of the preceding eighteen paragraphs, the polymer inclusive shell may be mesogenic.

In the switchable window of any of the preceding nineteen paragraphs, the first substrate may support the first transparent conductive electrode and a first dielectric layer comprising an oxide of silicon and/or silicon oxynitride, wherein the first dielectric layer comprising the oxide of silicon and/or silicon oxynitride may be located between and contacting the electro-optical layer and the first transparent conductive electrode.

In the switchable window of any of the preceding twenty paragraphs, the second substrate may support the second transparent conductive electrode and a second dielectric layer comprising an oxide of silicon and/or silicon oxynitride, wherein the second dielectric layer comprising the oxide of silicon and/or silicon oxynitride is located between and contacting the electro-optical layer and the second transparent conductive electrode.

In the switchable window of any of the preceding twenty-one paragraphs, the polymer inclusive shell may comprises a mixture of the polymer and liquid crystal.

In the switchable window of any of the preceding twenty-two paragraphs, at all angles of incidence from 0-80 degrees in the ON state ns may be from 1.62 to 1.71, more preferably from 1.63 to 1.69.

In the switchable window of any of the preceding twenty-three paragraphs, at all angles of incidence from 0-80 degrees in the ON state nc may be from 1.57 to 1.66, more preferably from 1.58 to 1.64.

In the switchable window of any of the preceding twenty-four paragraphs, at all angles of incidence from 0-80 degrees in the ON state np may be from 1.52 to 1.60, more preferably from 1.52 to 1.59.

In the switchable window of any of the preceding twenty-five paragraphs, wherein ns is the effective refractive index of the shell when the elecro-optical layer is in an ON state, across an angle of incidence range from 0 to 80 degrees in the ON state of the electro-optical layer ns need not change by more than 0.1, more preferably need not change by more than 0.05, and most preferably need not change by more than 0.04.

In the switchable window of any of the preceding twenty-six paragraphs, wherein nc is the effective refractive index of the core when the elecro-optical layer is in an ON state, and wherein across an angle of incidence range from 0 to 80 degrees in the ON state of the electro-optical layer nc need not change by more than 0.05, more preferably need not change by more than 0.03.

In the switchable window of any of the preceding twenty-seven paragraphs, wherein np is the effective refractive index of the polymer when the elecro-optical layer is in an ON state, and wherein across an angle of incidence range from 0 to 80 degrees in the ON state of the electro-optical layer np need not change by more than 0.05, more preferably need not change by more than 0.03.

While various example embodiments of the present disclosure have been described and illustrated in detail above, it will be understood by one or ordinary skill in the art that various modifications, variations and alternatives will be apparent, and that these modifications, variations and alternatives may fall within the full spirit and true scope of the disclosure as defined in the appended claims.

What is claimed is:

1. A switchable window, comprising:
   first and second transparent substrates supporting first and second transparent conductive electrodes, respectively;
   an electro-optical layer comprising a plurality of microcell cores dispersed in a connective polymer based matrix, each said microcell core comprising polymer stabilized highly chiral liquid crystal and being encapsulated in a polymer inclusive shell;
   wherein the electro-optical layer is sandwiched between the first and second substrates, and between the first and second transparent conductive electrodes;
   wherein np<nc<ns for all angles of incidence from 0-80 degrees in the ON state, where np, nc and ns are the effective refractive indices of the polymer, core, and shell, respectively, in a transmissive ON state; and
   wherein across angles of incidence ranging from 0 to 80 degrees in the ON state of the electro-optical layer each of np, nc, and ns do not change by more than 0.1.

2. The switchable window of claim 1, wherein the polymer stabilized highly chiral liquid crystal comprise nematic liquid crystal doped with a chiral dopant.

3. The switchable window of claim 2, wherein the chiral dopant comprises first and second different chiral dopants, each chiral dopant having a different respective twist, so that the first and second chiral dopants provide for different twists relative to each other.

4. The switchable window of claim 3, wherein the liquid crystal forms a double twist cylinder.

5. The switchable window of claim 4, wherein a plurality of double twist cylinders are arranged in a matrix structure.

6. The switchable window of claim 5, wherein the microcell cores each comprise blue phase liquid crystal comprising a plurality of double twist cylinders arranged in a matrix structure.

7. The switchable window of claim 1, wherein the switchable window is configured to form an electric field between the first and second transparent electrodes, the electric field causing the polymer stabilized highly chiral liquid crystal to align to put the switchable window in a transmissive ON state in which the switchable window is substantially transparent.

8. The switchable window of claim 7, wherein a haze value for the switchable window in the transmissive state is ≤6% at a viewing angle of 45 degrees from a normal viewing angle.

9. The switchable window of claim 7, wherein a haze value for the switchable window in the transmissive state is ≤4% at a viewing angle of 45 degrees from a normal viewing angle.

10. The switchable window of claim 7, wherein a haze value for the switchable window in the transmissive state is ≤3% at a viewing angle of 45 degrees from a normal viewing angle.

11. The switchable window of claim 7, wherein a haze value for the switchable window in the transmissive state is ≤2% at a viewing angle of 45 degrees from a normal viewing angle.

12. The switchable window of claim 7, wherein a haze value for the switchable window in the transmissive state is ≤6% at a viewing angle of 60 degrees from a normal viewing angle.

13. The switchable window of claim 7, wherein a haze value for the switchable window in the transmissive state is ≤4% at a viewing angle of 60 degrees from a normal viewing angle.

14. The switchable window of claim 7, wherein a haze value for the switchable window in the transmissive state is ≤3% at a viewing angle of 60 degrees from a normal viewing angle.

15. The switchable window of claim 7, wherein a haze value for the switchable window in the transmissive state is ≤2% at a viewing angle of 60 degrees from a normal viewing angle.

16. The switchable window of claim 1, wherein a haze value of the switchable window in a non-transmissive state, when the electro-optical layer is in an OFF state, is at least 90% at substantially all viewing angles.

17. The switchable window of claim 1, wherein a haze value of the switchable window in a non-transmissive state is at least 95% at substantially all viewing angles.

18. The switchable window of claim 1, wherein a haze value of the switchable window in a non-transmissive state is in a range of 100%±3% at substantially all viewing angles.

19. The switchable window of claim 1, wherein the polymer inclusive shell is substantially spherical.

20. The switchable window of claim 1, wherein a thickness of the polymer inclusive shell is in a range of 0.25 to 1 μm.

21. The switchable window of claim 1, wherein a diameter of the liquid crystal material encapsulated in the polymer inclusive shell is in a range of 1 to 10 μm.

22. The switchable window of claim 1, wherein the first and second transparent substrates are glass substrates.

23. The switchable window of claim 1, wherein the first and second transparent substrates each comprise PET.

24. The switchable window of claim 1, wherein the electro-optical layer is an anisotropic gel.

25. The switchable window of claim 1, wherein the window has a visible transmission of at least 60% when the electro-optical layer is in the transmissive state.

26. The switchable window of claim 1, wherein the window has a visible transmission of at least 70% when the electro-optical layer is in the transmissive state.

27. The switchable window of claim 1, wherein the electro-optical layer is an anisotropic gel, and a ratio of polymer/LC in the anisotropic gel is from about 10-30%.

28. The switchable window of claim 1, wherein polymer distribution in the electro-optical layer is not uniform, so that there is a greater percentage of polymer, compared to liquid crystal, in a middle plane between the first and second electrodes, and there is a lesser percentage of polymer, compared to liquid crystal, closer to the electrodes.

29. The switchable window of claim 1, wherein the polymer inclusive shell is mesogenic.

30. The switchable window of claim 1, wherein the polymer inclusive shell comprises a mixture of the polymer and liquid crystal.

31. The switchable window of claim 1, wherein the first substrate supports the first transparent conductive electrode and a first dielectric layer comprising an oxide of silicon and/or silicon oxynitride, wherein the first dielectric layer comprising the oxide of silicon and/or silicon oxynitride is located between and contacting the electro-optical layer and the first transparent conductive electrode.

32. The switchable window of claim 1, wherein the second substrate supports the second transparent conductive electrode and a second dielectric layer comprising an oxide of silicon and/or silicon oxynitride, wherein the second dielectric layer comprising the oxide of silicon and/or silicon oxynitride is located between and contacting the electro-optical layer and the second transparent conductive electrode.

33. The switchable window of claim 1, wherein at all angles of incidence from 0-80 degrees in the ON state ns is from 1.62 to 1.71.

34. The switchable window of claim 1, wherein at all angles of incidence from 0-80 degrees in the ON state ns is from 1.63 to 1.69.

35. The switchable window of claim 1, wherein at all angles of incidence from 0-80 degrees in the ON state nc is from 1.57 to 1.66.

36. The switchable window of claim 1, wherein at all angles of incidence from 0-80 degrees in the ON state nc is from 1.58 to 1.64.

37. The switchable window of claim 1, wherein at all angles of incidence from 0-80 degrees in the ON state np is from 1.52 to 1.60.

38. The switchable window of claim 1, wherein at all angles of incidence from 0-80 degrees in the ON state np is from 1.52 to 1.59.

39. The switchable window of claim 1, wherein ns is the effective refractive index of the shell when the elecro-optical layer is in an ON state, and wherein across an angle of incidence range from 0 to 80 degrees in the ON state of the electro-optical layer ns does not change by more than 0.05.

40. The switchable window of claim 1, wherein ns is the effective refractive index of the shell when the elecro-optical layer is in an ON state, and wherein across an angle of incidence range from 0 to 80 degrees in the ON state of the electro-optical layer ns does not change by more than 0.04.

41. The switchable window of claim 1, wherein nc is the effective refractive index of the core when the electro-optical layer is in an ON state, and wherein across an angle of incidence range from 0 to 80 degrees in the ON state of the electro-optical layer nc does not change by more than 0.05.

42. The switchable window of claim 1, wherein nc is the effective refractive index of the core when the elecro-optical layer is in an ON state, and wherein across an angle of incidence range from 0 to 80 degrees in the ON state of the electro-optical layer nc does not change by more than 0.03.

43. The switchable window of claim 1, wherein np is the effective refractive index of the polymer when the elecro-optical layer is in an ON state, and wherein across an angle of incidence range from 0 to 80 degrees in the ON state of the electro-optical layer np does not change by more than 0.05.

44. The switchable window of claim 1, wherein np is the effective refractive index of the polymer when the elecro-optical layer is in an ON state, and wherein across an angle of incidence range from 0 to 80 degrees in the ON state of the electro-optical layer np does not change by more than 0.03.

45. A switchable window, comprising:
first and second transparent substrates supporting first and second transparent conductive electrodes, respectively;
an anisotropic gel electro-optical layer comprising a plurality of cores dispersed in a connective polymer based matrix, each said core comprising chiral doped liquid crystal and being encapsulated in a polymer inclusive shell;
wherein the anisotropic gel electro-optical layer is sandwiched between the first and second substrates, and between the first and second transparent conductive electrodes;
wherein the switchable window is configured to form an electric field between the first and second transparent conductive electrodes, the electric field for causing the liquid crystal to substantially align to put the anisotropic gel electro-optical layer in a transmissive ON state in which the switchable window is substantially transparent;
wherein np<nc<ns for all angles of incidence from 0-80 degrees in the ON state, where np, nc and ns are the effective refractive indices of the polymer, core, and shell, respectively, in the transmissive ON state; and
wherein across angles of incidence ranging from 0 to 80 degrees in the ON state of the electro-optical layer each of np, nc, and ns do not change by more than 0.1.

46. The switchable window of claim 45, wherein chiral dopant in the anisotropic gel electro-optical layer comprises first and second different chiral dopants, each chiral dopant having a different respective twist, so that the first and second chiral dopants provide for different twists relative to each other.

47. The switchable window of claim 45, wherein a haze value for the switchable window in the transmissive state is ≤6% at a viewing angle of 45 degrees from a normal viewing angle.

48. The switchable window of claim 45, wherein a haze value for the switchable window in the transmissive state is ≤4% at a viewing angle of 45 degrees from a normal viewing angle.

49. The switchable window of claim 45, wherein a haze value for the switchable window in the transmissive state is ≤6% at a viewing angle of 60 degrees from a normal viewing angle.

50. The switchable window of claim 45, wherein a haze value for the switchable window in the transmissive state is ≤4% at a viewing angle of 60 degrees from a normal viewing angle.

51. The switchable window of claim 45, wherein a haze value of the switchable window in a non-transmissive state, is at least 90% at substantially all viewing angles.

52. The switchable window of claim 45, wherein the first and second transparent substrates are glass substrates.

53. The switchable window of claim 45, wherein the first and second transparent substrates each comprise PET.

54. The switchable window of claim 45, wherein a ratio of polymer/LC in the anisotropic gel is from about 10-30%.

55. The switchable window of claim 45, wherein polymer distribution in the anisotropic gel electro-optical layer is not uniform, so that there is a greater percentage of polymer, compared to liquid crystal, in a middle plane between the first and second electrodes, and there is a lesser percentage of polymer, compared to liquid crystal, closer to the electrodes.

56. The switchable window of claim 45, wherein the polymer inclusive shell comprises a mixture of the polymer and liquid crystal.

57. The switchable window of claim 45, wherein the first substrate supports the first transparent conductive electrode and a first dielectric layer comprising an oxide of silicon and/or silicon oxynitride, wherein the first dielectric layer comprising the oxide of silicon and/or silicon oxynitride is located between and contacting the anisotropic gel electro-optical layer and the first transparent conductive electrode.

58. The switchable window of claim 45, wherein at all angles of incidence from 0-80 degrees in the ON state ns is from 1.62 to 1.71.

59. The switchable window of claim 45, wherein at all angles of incidence from 0-80 degrees in the ON state nc is from 1.57 to 1.66.

60. The switchable window of claim 45, wherein at all angles of incidence from 0-80 degrees in the ON state np is from 1.52 to 1.60.

61. The switchable window of claim 45, wherein across an angle of incidence range from 0 to 80 degrees in the ON state of the electro-optical layer ns does not change by more than 0.05.

62. The switchable window of claim 45, wherein across an angle of incidence range from 0 to 80 degrees in the ON state of the electro-optical layer nc does not change by more than 0.05.

63. The switchable window of claim 45, wherein across an angle of incidence range from 0 to 80 degrees in the ON state of the electro-optical layer np does not change by more than 0.05.

64. The switchable window of claim 45, wherein the anisotropic gel electro-optical layer is from about 9-17 µm thick.

* * * * *